(12) United States Patent
Gormley

(10) Patent No.: US 12,480,114 B2
(45) Date of Patent: Nov. 25, 2025

(54) NUCLEIC ACID LIBRARY PREPARATION USING ELECTROPHORESIS

(71) Applicant: Illumina Cambridge Limited, Cambridge (GB)

(72) Inventor: Niall Anthony Gormley, Cambridge (GB)

(73) Assignee: Illumina, Inc., San Diego, CA (US)

( * ) Notice: Subject to any disclaimer, the term of this patent is extended or adjusted under 35 U.S.C. 154(b) by 958 days.

(21) Appl. No.: 17/419,485

(22) PCT Filed: Jul. 10, 2020

(86) PCT No.: PCT/GB2020/051669
§ 371 (c)(1),
(2) Date: Jun. 29, 2021

(87) PCT Pub. No.: WO2021/009494
PCT Pub. Date: Jan. 21, 2021

(65) Prior Publication Data
US 2022/0127596 A1    Apr. 28, 2022

Related U.S. Application Data

(60) Provisional application No. 62/873,603, filed on Jul. 12, 2019.

(51) Int. Cl.
*C12N 15/10* (2006.01)
*G01N 27/453* (2006.01)

(52) U.S. Cl.
CPC ....... *C12N 15/1065* (2013.01); *G01N 27/453* (2013.01)

(58) Field of Classification Search
None
See application file for complete search history.

(56) References Cited

U.S. PATENT DOCUMENTS

| | | | |
|---|---|---|---|
| 5,130,238 A | 7/1992 | Malek et al. | |
| 5,185,243 A | 2/1993 | Ullman et al. | |
| 5,455,166 A | 10/1995 | Walker | |
| 5,573,907 A | 11/1996 | Carrino et al. | |
| 5,679,524 A | 10/1997 | Nikiforov et al. | |

(Continued)

FOREIGN PATENT DOCUMENTS

| | | |
|---|---|---|
| EP | 0320308 B1 | 11/1993 |
| EP | 0336731 B1 | 5/1994 |

(Continued)

OTHER PUBLICATIONS

MuSeek Library Preparation Manual. Thermo Scientific. (Year: 2013).*

(Continued)

*Primary Examiner* — Aaron A Priest
*Assistant Examiner* — Matthew Harold Raymonda
(74) *Attorney, Agent, or Firm* — Fletcher Yoder P.C.

(57) ABSTRACT

Described herein are methods and systems for performing chemical or enzymatic reactions using electrophoresis. Devices, systems, and methods for preparing a library of tagged nucleic acid fragments from a target double-stranded nucleic acid using electrophoresis are also provided. Application of one or more electric fields causes molecules to migrate through the electrophoresis gel matrix.

16 Claims, 8 Drawing Sheets

Specification includes a Sequence Listing.

(56) References Cited

U.S. PATENT DOCUMENTS

| | | |
|---|---|---|
| 5,925,545 A | 7/1999 | Reznikoff et al. |
| 5,965,443 A | 10/1999 | Reznikoff et al. |
| 6,214,587 B1 | 4/2001 | Dattagupta et al. |
| 7,057,026 B2 | 6/2006 | Barnes et al. |
| 7,083,980 B2 | 8/2006 | Reznikoff et al. |
| 7,211,414 B2 | 5/2007 | Hardin et al. |
| 7,315,019 B2 | 1/2008 | Turner et al. |
| 7,329,492 B2 | 2/2008 | Hardin et al. |
| 7,405,281 B2 | 7/2008 | Xu et al. |
| 7,582,420 B2 | 9/2009 | Oliphant et al. |
| 7,608,434 B2 | 10/2009 | Reznikoff et al. |
| 7,611,869 B2 | 11/2009 | Fan |
| 8,003,354 B2 | 8/2011 | Shen et al. |
| 8,361,298 B2 | 1/2013 | Sabin et al. |
| 8,361,299 B2 | 1/2013 | Sabin et al. |
| 2008/0108082 A1 | 5/2008 | Rank et al. |
| 2009/0026082 A1 | 1/2009 | Rothberg et al. |
| 2009/0127589 A1 | 5/2009 | Rothberg et al. |
| 2010/0137143 A1 | 6/2010 | Rothberg et al. |
| 2010/0282617 A1 | 11/2010 | Rothberg et al. |
| 2011/0059865 A1 | 3/2011 | Smith et al. |
| 2012/0208705 A1 | 8/2012 | Steemers et al. |
| 2012/0208724 A1 | 8/2012 | Steemers et al. |
| 2012/0301925 A1 | 11/2012 | Belyaev |
| 2013/0143774 A1 | 6/2013 | Actis et al. |
| 2018/0245069 A1 | 8/2018 | DeSantis et al. |
| 2019/0040382 A1 | 2/2019 | Steemers et al. |
| 2019/0153426 A1* | 5/2019 | Abrams ........... G01N 27/44773 |

FOREIGN PATENT DOCUMENTS

| | | |
|---|---|---|
| EP | 0439182 B1 | 4/1996 |
| EP | 2527438 A1 | 11/2012 |
| RU | 123960 U1 | 1/2013 |
| WO | 198909835 A1 | 10/1989 |
| WO | 198912696 A1 | 12/1989 |
| WO | 199001069 A1 | 2/1990 |
| WO | 199106678 A1 | 5/1991 |
| WO | 1995023875 A1 | 9/1995 |
| WO | 2001009363 A1 | 2/2001 |
| WO | 2002027312 A1 | 4/2002 |
| WO | 2004018497 A3 | 6/2004 |
| WO | 2007123744 A3 | 11/2008 |
| WO | 2010042766 A1 | 4/2010 |
| WO | 2010048605 A1 | 4/2010 |
| WO | 2012061832 A1 | 5/2012 |
| WO | 2013131962 A1 | 9/2013 |
| WO | 2014059188 A1 | 4/2014 |
| WO | 2014108810 | 9/2014 |
| WO | 2014142850 A1 | 9/2014 |
| WO | 2015189636 A1 | 12/2015 |
| WO | 2016003814 A1 | 1/2016 |
| WO | 2016061416 A1 | 4/2016 |
| WO | 2016073690 A1 | 5/2016 |
| WO | 2017087979 A1 | 5/2017 |
| WO | 2017132630 A1 | 8/2017 |
| WO | 2018156519 A1 | 8/2018 |

OTHER PUBLICATIONS

Decision to Grant received in corresponding Russian Application No. 2021118530, dated May 5, 2023 (26 pages).
Search Report issued in corresponding Chinese Application No. 202080007405.1, dated Dec. 21, 2023, 11 pages (English translation).
Hennig et al., "Large-Scale Low-Cost NGS Library Preparation Using a Robust Tn5 Purification and Tagmentation Protocol," G3, 2018, 8(1): 79-89.
Kaya-Okur et al., "CUT&Tag for Efficient Epigenomic Profiling of Small Samples and Single Cells," Nature Communications, 2019, 10(1930): 1-10.
Office Action received in corresponding Japanese Application No. 2021-535050, dated Mar. 14, 2024, 13 pages (English translation).
Examination Report issued in corresponding European Application No. 20742401.1, dated Dec. 13, 2022 (6 pages).
Bentley et al., "Accurate whole human genome sequencing using reversible terminator chemistry," Nature, vol. 456, pp. 53-59, 2008.
Boeke and Corces, "Transcription and reverse transcription of retrotransposons," Annual Review of Microbiology, vol. 43, pp. 403-434, 1989.
Brown et al., "Retroviral integration: structure of the initial covalent product and its precursor, and a role for the viral in protein," Proceedings of the National Academy of Sciences of the USA, vol. 86, pp. 2525-2529, 1989.
Colegio et al., "In vitro transposition system for efficient generation of random mutants of Campylobacter jejuni," Journal of Bacteriology, vol. 183, No. 7, pp. 2384-2388, 2001.
Craig, "Transposon Tn7," Current Topics in Microbiology and Immunology, vol. 204, pp. 27-48, 1996.
Craig, "V(D)J Recombination and Transposition: Closer Than Expected," Science, vol. 271, p. 1512, 1996.
Deamer and Akeson, "Nanopores and nucleic acids: prospects for ultrarapid sequencing," Trends in Biotechnology, vol. 18, No. 4, pp. 147-151, 2000.
Deamer et al., "Characterization of nucleic acids by nanopore analysis," Accounts of Chemical Research, vol. 35, No. 10, pp. 817-825, 2002.
Dean et al., "Comprehensive human genome amplification using multiple displacement amplification," PNAS, vol. 99, No. 8, pp. 5261-5266, 2002.
Devine and Boeke, "Efficient integration of artificial transposons into plasmid targets in vitro: a useful tool for DNA mapping, sequencing and genetic analysis," Nucleic Acids Research, vol. 22, No. 18, pp. 3765-3772, 1994.
Gloor, "Gene targeting in Drosophila," Methods in Molecular Biology, vol. 260, pp. 97-114, 2004.
Goryshin and Reznikoff, "Tn5 in Vitro Transposition," Journal of Biological Chemistry, vol. 273, No. 13, pp. 7367-7374, 1998.
Grothues et al. "PCR amplification of megabase DNA with tagged random primers (T-PCR)," Nucleic Acids Research, vol. 21, No. 5, pp. 1321-1322, 1993.
Hellman and Fried, "Electrophoretic mobility shift assay (EMSA) for detecting protein-nucleic acid interactions," Nature Protocols 2007, vol. 2, No. 8, pp. 1849-1861, 2007.
Ichikawa and Ohtsubo, "In Vitro Transposition of Transposon Tn3," The Journal of Biological Chemistry, vol. 265, No. 31, pp. 18829-18832, 1990.
International Search Report and Written Opinion, International Application No. PCT/GB2020/051669, 16 pages, 2020.
Kirby et al., "Cryptic plasmids of Mycobacterium avium: Tn552 to the rescue," Molecular Microbiology, vol. 43, No. 1, pp. 173-186, 2002.
Kleckner et al., "Tn10 and IS10 transposition and chromosome rearrangements: mechanism and regulation in vivo and in vitro," Current Topics in Microbiology and Immunology, vol. 204, pp. 49-82, 1996.
Lage et al., "Whole genome analysis of genetic alterations in small DNA samples using hyperbranched strand displacement amplification and array-CGH," Genome Research, vol. 13, No. 2, pp. 294-307, 2003.
Lampe et al., "A purified mariner transposase is sufficient to mediate transposition in vitro," The EMBO Journal, vol. 15, No. 19, pp. 5470-5479, 1996.
Leriche and Wagner, "Cleavable linkers in chemical biology," Bioorganic & Medicinal Chemistry, vol. 20, No. 2, pp. 571-582, 2012.
Li et al., "DNA molecules and configurations in a solid-state nanopore microscope," Nature Materials, vol. 2, No. 9, pp. 611-615, 2003.
Lizardi et al., "Mutation detection and single-molecule counting using isothermal rolling-circle amplification," Nature Genetics, vol. 19, pp. 225-232, 1998.
Mizuuchi, "In vitro transposition of bacteriophage Mu: A biochemical approach to a novel replication reaction," Cell, vol. 35, No. 3, Part 2, pp. 785-794, 1983.

(56) References Cited

OTHER PUBLICATIONS

Ohtsubo and Sekine, "Bacterial insertion sequences," Current Topics in Microbiology and Immunology, vol. 204, pp. 1-26, 1996.
Plasterk, "The Tc1/mariner transposon family," Current Topics in Microbiology and Immunology, vol. 204, pp. 125-143, 1996.
Reznikoff et al., "Tn5: A Molecular Window on Transposition," Biochemical and Biophysical Research Communications, vol. 266, pp. 729-734, 1999.
Salimullah et al., "High-throughput Three-dimensional Gel Electrophoresis for Versatile Utilities: A Stacked Slice-gel System for Separation and Reactions (4SR)," Genomics Proteomics and Bioinformatics, vol. 4, No. 1, pp. 26-33, 2006.
Savilahti et al., "The phage Mu transposome core: DNA requirements for assembly and function," The EMBO Journal, vol. 14, No. 19, pp. 4893-4903, 1995.
Walker et al., "Strand displacement amplification—an isothermal, in vitro DNA amplification technique," Nucleic Acids Research, vol. 20, No. 7, pp. 1691-1696, 1992.
Wilson et al., "New transposon delivery plasmids for insertional mutagenesis in Bacillus anthracis," Journal of Microbiological Methods, vol. 71, No. 3, pp. 332-335, 2007.
Zhang and Saier, "A Novel Mechanism of Transposon-Mediated Gene Activation," PLoS Genetics, vol. 5, No. 10, 2009.

\* cited by examiner

SEQUENCE LISTING

```
<160> NUMBER OF SEQ ID NOS: 2

<210> SEQ ID NO 1
<211> LENGTH: 29
<212> TYPE: DNA
<213> ORGANISM: Artificial Sequence
<220> FEATURE:
<223> OTHER INFORMATION: P5 primer example
<220> FEATURE:
<221> NAME/KEY: misc_feature
<222> LOCATION: (1)..(1)
<223> OTHER INFORMATION: May be alkyne terminated at the 5' position.
<220> FEATURE:
<221> NAME/KEY: misc_feature
<222> LOCATION: (1)..(1)
<223> OTHER INFORMATION: May further comprise a poly T tail at the 5'
      end.  The poly T sequence can include any number of T nucleotides,
```

```
                            for example, from 2 to 20.
<220> FEATURE:
<221> NAME/KEY: misc_feature
<222> LOCATION: (29)..(29)
<223> OTHER INFORMATION: May further comprise a poly T tail at the 3'
      end.  The poly T sequence can include any number of T nucleotides,
      for example, from 2 to 20.

<400> SEQUENCE: 1
aatgatacgg cgaccaccga gatctacac                                           29

<210> SEQ ID NO 2
<211> LENGTH: 24
<212> TYPE: DNA
<213> ORGANISM: Artificial Sequence
<220> FEATURE:
<223> OTHER INFORMATION: P7 Primer Example
<220> FEATURE:
<221> NAME/KEY: misc_feature
<222> LOCATION: (1)..(1)
<223> OTHER INFORMATION: May be alkyne terminated at the 5' position.
<220> FEATURE:
<221> NAME/KEY: misc_feature
<222> LOCATION: (1)..(1)
<223> OTHER INFORMATION: May further comprise a poly T tail at the 5'
      end.  The poly T sequence can include any number of T nucleotides,
      for example, from 2 to 20.
<220> FEATURE:
<221> NAME/KEY: misc_feature
<222> LOCATION: (22)..(22)
<223> OTHER INFORMATION: This guanine may be a modified guanine, e.g.,
      an 8-oxo-guanine.
<220> FEATURE:
<221> NAME/KEY: misc_feature
<222> LOCATION: (22)..(23)
<223> OTHER INFORMATION: This G and A may be linked by a
      phosphorothioate bond.
<220> FEATURE:
<221> NAME/KEY: misc_feature
<222> LOCATION: (24)..(24)
<223> OTHER INFORMATION: May further comprise a poly T tail at the 3'
      end.  The poly T sequence can include any number of T nucleotides,
      for example, from 2 to 20.

<400> SEQUENCE: 2
caagcagaag acggcatacg agat                                                24
```

NUCLEIC ACID LIBRARY PREPARATION USING ELECTROPHORESIS

CROSS-REFERENCE TO RELATED APPLICATION

This application is a national stage entry of International Patent Application No. PCT/GB2020/051669, filed Jul. 10, 2020, which claims the benefit of priority of U.S. Provisional Application No. 62/873,603, filed Jul. 12, 2019, the content of which is incorporated by reference herein in its entirety for any purpose.

SEQUENCE LISTING

This application contains a Sequence Listing in computer readable form entitled "2020 Sep. 2_01243-0014-00PCT_LFSEQL," created Sep. 2, 2020, having a size of 2 KB, which is incorporated by reference herein.

DESCRIPTION

Field

The present application relates to methods and systems for processing nucleic acid molecules into nucleic acid libraries using electrophoresis. The present application also relates to methods, devices, and systems for a library preparation using electrophoresis.

Background

There are a variety of methods and applications for which it is desirable to generate a library of fragmented and tagged nucleic acid (e.g., DNA) molecules from double-stranded nucleic acid target molecules (e.g., double-stranded DNA (dsDNA)). Often, the purpose is to generate smaller nucleic acid molecules (e.g., nucleic acid or DNA fragments) from larger target nucleic acid molecules for use as templates in sequencing reactions. Preparing libraries for sequencing is fraught with challenges when large nucleic acid molecules are employed: large molecules are fragile and easily damaged (such as generating abasic sites or nicks) with excessive handling and manipulation through multiple different physical processes such as cell lysis, centrifugation, pipetting, sample transfer, and vortexing. Such damage leads to errors in sequencing the target nucleic acids.

Described herein are methods for performing multiple steps of combining and separating using electrophoresis for preparation of nucleic acid libraries for sequencing (e.g., tagmentation) that reduce the risk of physical damage to the nucleic acids. These approaches also can be easily applied for performing other processes, such as sample preparation, sample extraction, biochemical reactions, product purification, and nucleic acid fragment size selection.

SUMMARY

The present application relates to methods and devices for combining and separating substrates, reagents, and products for an enzymatic reaction using gel electrophoresis. The present application also relates to methods, systems, and devices for fragmenting and tagging nucleic acids, such as DNA, using transposome complexes using gel electrophoresis. The methods, systems, and devices described herein relate to methods and compositions for fragmenting and tagging DNA using transposome complexes using gel electrophoresis. The methods, systems, and devices presented herein may be used, for example, for generating libraries of tagged nucleic acid (e.g., DNA) fragments for use, e.g., in next generation sequencing methods, and the like. In some embodiments, the present application relates to preparation of DNA fragments from target DNA comprising any double-stranded DNA of interest (including double-stranded cDNA prepared from RNA), from any source, for genomic, sub-genomic, transcriptomic, or metagenomic analysis, or analysis of RNA expression.

In accordance with the description herein, in one embodiment, a method of for performing an enzymatic reaction using electrophoresis comprises:
 (a) providing an electrophoresis system comprising:
  an electrophoresis gel matrix having a first end and a second end and a length between the first and second ends;
  a first portion proximate to the first end and containing a first enzyme cofactor for an enzyme;
  a second portion proximate to the second end and containing a second enzyme cofactor for the enzyme, the second enzyme cofactor having an electrical charge opposite to that of the first enzyme cofactor;
  a reaction portion between the first portion and the second portion and containing the enzyme; and
  a pair of positive and negative electrodes arranged at the first and second ends, respectively; and
 (b) applying an electric field between the pair of electrodes to drive the first enzyme cofactor from the first portion into the reaction portion and drive the second enzyme cofactor from the second portion into the reaction portion to form an activated enzyme complex comprising the enzyme, the first enzyme cofactor, and the second enzyme cofactor.

In some embodiments, a method of preparing a library of tagged nucleic acid fragments from a target double-stranded nucleic acid is provided, the method comprising:
 (a) providing an electrophoresis system comprising:
  an electrophoresis gel matrix having a first end and a second end, a width, and a length between the first and second ends;
  a first portion proximate to the first end and containing a first transposase cofactor, wherein the first transposase cofactor is a metallic ion;
  a reaction portion distant to the first end and containing a transposome complex comprising a transposase and a polynucleotide transposase adaptor comprising a double-stranded transposon end sequence and a single-stranded tag region; and
  a pair of positive and negative electrodes arranged at the first and second ends, respectively;
 (b) applying a target double-stranded nucleic acid to the reaction portion;
 (c) applying a first electric field between the pair of electrodes to drive the first transposase cofactor from the first portion into the reaction portion to form an activated transposome complex comprising the transposase, the polynucleotide transposase adaptor, and the first transposase cofactor; and
 (d) incubating the target double-stranded nucleic acid with the activated transposome complex in the reaction portion under conditions sufficient to fragment the target double-stranded nucleic acid, not a plurality of nucleic acid fragments, and tag the nucleic acid fragments, thereby generating a library of tagged nucleic acid fragments.

In some embodiments, a method of preparing a library of tagged nucleic acid fragments from a target double-stranded nucleic acid is provided, the method comprising:

(a) providing an electrophoresis system comprising:
    an electrophoresis gel matrix having a first end and a second end, a width, and a length between the first and second ends;
    a first portion proximate to the first end and containing a first transposase cofactor for a transposase, wherein the first transposase cofactor is a metallic ion;
    a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
    a reaction portion between the first portion and the second portion and containing the transposase; and
    a pair of positive and negative electrodes arranged at the first and second ends, respectively;
(b) applying a target double-stranded nucleic acid to the reaction portion;
(c) applying a first electric field between the pair of electrodes to drive the first transposase cofactor from the first portion into the reaction portion and drive the second transposase cofactor from the second portion into the reaction portion to form an activated transposome complex comprising the transposase, the first transposase cofactor, and the second transposase cofactor; and
(d) incubating the target double-stranded nucleic acid with the activated transposome complex in the reaction portion under conditions sufficient to fragment the target double-stranded nucleic acid, not a plurality of nucleic acid fragments, and tag the nucleic acid fragments, thereby generating a library of tagged nucleic acid fragments.

In some embodiments, a method of preparing a library of tagged nucleic acid fragments from a target double-stranded nucleic acid is provided, the method comprising:

(a) providing an electrophoresis system comprising:
    an electrophoresis gel matrix having a first end and a second end, a width, and a length between the first and second ends;
    a first portion containing a first transposase cofactor for a transposase, wherein the first transposase cofactor is a metallic ion;
    a second portion containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
    a third portion containing a lysis reagent;
    a fourth portion containing the transposase;
    a reaction portion between the first portion and the second portion; and
    a first pair of positive and negative electrodes arranged at the first and second ends, respectively; and
    a second pair of positive and negative electrodes arranged at opposite sides of the width at one of the first end or the second end;
(b) applying whole cells containing a target double-stranded nucleic acid to the reaction portion;
(c) applying a first electric field to drive the lysis agent into and/or through the reaction portion to lyse the cells, thereby applying the target double-stranded nucleic acid to the sample portion;
(d) applying a second electric field to drive the first transposase cofactor from the first portion into the reaction portion, drive the second transposase cofactor from the second portion into the reaction portion, and/or drive the transposase from the transposase portion to the reaction portion to form an activated transposome complex comprising the transposase, the first transposase cofactor, and the second transposase cofactor; and
(e) incubating the target double-stranded nucleic acid with the activated transposome complex in the reaction portion under conditions sufficient to fragment the target double-stranded nucleic acid not a plurality of nucleic acid fragments and tag the nucleic acid fragments, thereby generating a library of tagged nucleic acid fragments.

In some embodiments, an electrophoresis device comprises an electrophoresis gel matrix having a first end, a second end and a length between the first and second ends; a first portion proximate to the first end and containing a first enzyme cofactor for an enzyme; a second portion proximate to the second end and containing a second enzyme cofactor for the enzyme, the second enzyme cofactor having an electrical charge opposite to that of the first enzyme cofactor; a reaction portion between the first portion and the second portion and containing the enzyme; and a pair of positive and negative electrodes arranged at the first and second ends, respectively.

In some embodiments, an electrophoresis device comprises an electrophoresis gel matrix having a first end and a second end, a width, and a length between the first and second ends; a first portion proximate to the first end and containing a first transposase cofactor, wherein the first transposase cofactor is a metallic ion; a reaction portion distant to the first end and containing a transposome complex comprising a transposase and a polynucleotide transposase adaptor comprising a double-stranded transposon end sequence and a single-stranded tag region; and a pair of positive and negative electrodes arranged at the first and second ends, respectively.

In some embodiments, an electrophoresis device comprises an electrophoresis gel matrix having a first end, a second end, and a length between the first and second ends; a first portion proximate to the first end and containing a first transposase cofactor for a transposase, wherein the first transposase cofactor is a metallic ion; a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region; a reaction portion between the first end and the second end and containing the transposase; and a pair of positive and negative electrodes arranged at the first and second ends, respectively.

In some embodiments, an electrophoresis device comprises an electrophoresis gel matrix having a first end and a second end, a width, and a length between the first and second ends; a first portion proximate to the first end and containing a first transposase cofactor for a transposase, wherein the first transposase cofactor is a metallic ion; a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region; a third portion containing a lysis reagent; a fourth portion containing the transposase; a reaction portion between the first end and the second end; and a first pair of positive and negative electrodes arranged at the first and second ends, respectively; and a second pair of positive and negative electrodes arranged at opposite sides of the width at one of the first end or the second end.

Additional objects and advantages will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

The accompanying drawings, which are incorporated in and constitute a part of this specification, illustrate one (several) embodiment(s) and together with the description, serve to explain the principles described herein.

DETAILED DESCRIPTION

The section headings used herein are for organizational purposes only and are not to be construed as limiting the subject matter described.

The present disclosure relates to the methods and systems to perform chemical and/or enzymatic processes using electrophoresis, and in particular, relates to library preparation for nucleic acid (e.g., DNA) sequencing.

Gel electrophoresis system enables movement of molecules between positions in a 3D matrix. An electric field is applied to move molecules through the 3D matrix on intersecting trajectories. Different molecules migrate with different electrophoretic mobilities through the electric field. The methods described herein enable multiple reactions in different locations in the 3D matrix, through predetermined positioning of reagents such that they move in trajectories that intersect at sequential intervals in time and position, thus enabling multistep processes to be accomplished, e.g., nucleic acid library preparation, sample extraction, biochemistry, product purification, and size selection, all within a gel.

Figure 1A:
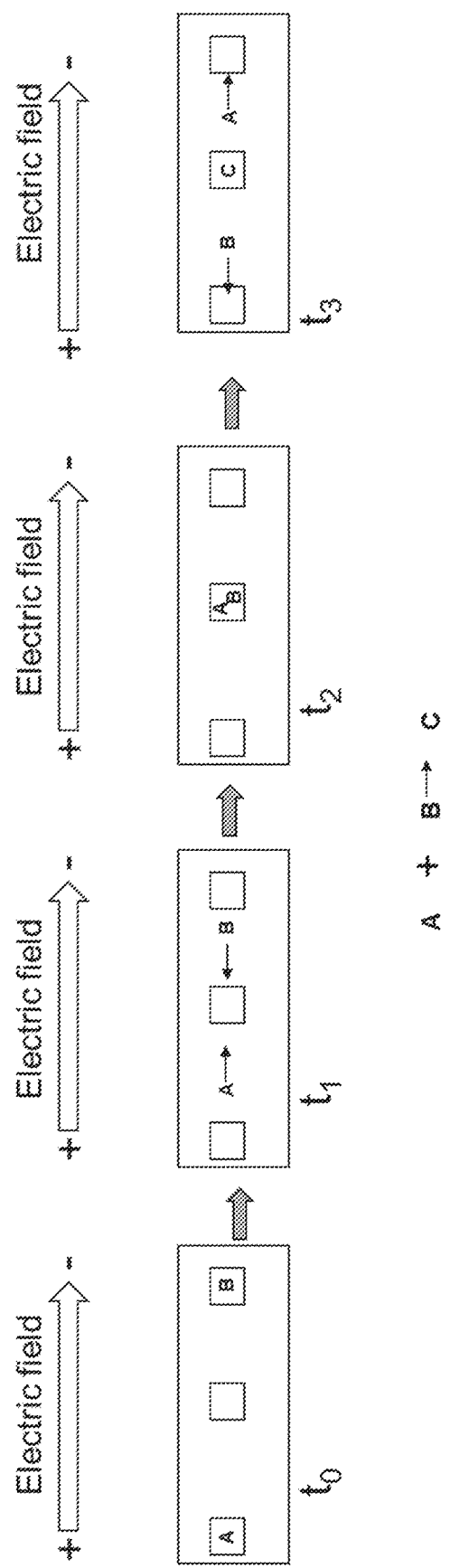
FIG. 1A illustrates the general schematics of performing a chemical reaction using gel electrophoresis. A, B: reagents; C: product.

In one embodiment, two molecules of known electrophoretic mobility may be positioned within a gel matrix and subjected to the same electric field such that they migrate in different directions and speeds but yet intersect at some point. As depicted in FIG. 1A, two reagents, A and B, migrate in opposite but facing directions from their starting positions at time t0, eventually combining after some time in the electric field (at t2) where they react to form product C. At a subsequent interval in time (t3), unreacted molecules of A and B continue to migrate in opposite directions but molecule C, by virtue of its mobility, either remains at the location where it has been formed or moves with different mobility than those of A and B and is thus separated and purified from unreacted molecules.

Transposase-Mediated Library Preparation

The methods and compositions presented herein provide several advantages for library preparation for sequencing. Libraries of fragmented nucleic acids are often created from genomic nucleic acids for use in next generation sequencing (NGS) applications. The present disclosure provides for methods, devices, and system for a transpositional library preparation. Current protocols for sequencing nucleic acid samples routinely employ a sample preparation process that converts DNA or RNA into a library of templates. In standard library preparation methods, each template contains an adaptor at either end of the insert and often a number of steps are required to both modify the DNA or RNA and to purify the desired products of the modification reactions. The number of steps required to transform DNA into adaptor-modified templates in solution ready for cluster formation and sequencing can be minimized by the use of transposase mediated fragmentation and tagging. This process, referred to herein as "tagmentation," often involves the modification of DNA by a transposome complex comprising transposase enzyme complexed with adaptors comprising transposon end sequence. Tagmentation results in the simultaneous fragmentation of the DNA and ligation of the adaptors to the 5' ends of both strands of duplex fragments. The tagged fragments are amplified, amplicons of interest are optionally captured (e.g., via hybridization probes), and the tagged fragments are sequenced.

Preparing libraries for sequencing by tagmentation can be challenging when large nucleic acid molecules are employed: large molecules are fragile and easily damaged (such as generating abasic sites or nicks) with excessive handling and manipulation through multiple different physical and chemical processes such as cell lysis, centrifugation, pipetting, sample transfer, vortexing, and other material manipulations.

The present application provides methods of performing library preparation using gel electrophoresis within a 3D matrix. An electric field is applied to move molecules through the 3D matrix on intersecting trajectories, thereby performing combining steps and separation steps. By performing the manipulations of sample extraction and library preparation based on the electrophoretic mobilities of reagents in the gel matrix, the risk of physical damage to the nucleic acids can be reduced. Damage is also reduced due to the physical embedding and protection of the nucleic acids within the gel matrix. Further, purification of tagged DNA fragments and reagents, following further manipulation of the DNA, can be achieved based on different mobilities.

In some embodiments, a method for performing an enzymatic reaction using electrophoresis is provided, the method comprising (a) providing an electrophoresis system comprising: an electrophoresis gel matrix having a first end and a second end and a length between the first and second ends; a first portion proximate to the first end and containing a first enzyme cofactor for an enzyme; a second portion proximate to the second end and containing a second enzyme cofactor for the enzyme, the second enzyme cofactor having an electrical charge opposite to that of the first enzyme cofactor; a reaction portion between the first portion and the second portion and containing the enzyme; and a pair of positive and negative electrodes arranged at the first and second ends, respectively; and (b) applying an electric field between the pair of electrodes to drive the first enzyme cofactor from the first portion into the reaction portion and drive the second enzyme cofactor from the second portion into the reaction portion to form an activated enzyme complex comprising the enzyme, the first enzyme cofactor, and the second enzyme cofactor.

In further embodiments, upon the first enzyme cofactor is a metallic ion and the second enzyme cofactor is a polynucleotide. In further embodiments, the method further comprises applying a substrate for the activated enzyme complex to the reaction portion prior to step (c), and applying the electric field comprises reacting the activated enzyme complex with the substrate in the reaction portion to form a reaction product. In further embodiments, applying the electric field comprises migrating unreacted first and second enzyme cofactors out of the reaction portion to separate the unreacted first and second enzyme cofactors from the reaction product in the reaction portion.

In some embodiments, the first electrode is a positive electrode and the first enzyme cofactor is positively charged, and the second electrode is a negative electrode and the second enzyme cofactor is negatively charged.

In some embodiments, the substrate is a target double-stranded nucleic acid. In further embodiments, the target double-stranded nucleic acid is double-stranded DNA, double-stranded RNA, or a DNA/RNA hybrid.

In some embodiments, the enzyme is a transposase. In some embodiments, the enzyme is a Tn5 transposase. In further embodiments, the first enzyme cofactor comprises $Mg^{2+}$. In some embodiments, the concentration of $Mg^{2+}$ is in a millimolar range. In some embodiments, the concentration of $Mg^{2+}$ is from 0.5 to 10 mM. In some embodiments, the concentration of $Mg^{2+}$ is from 1 to 10 mM. In some embodiments, the concentration of $Mg^{2+}$ is from 1 to 5 mM. In some embodiments, the concentration of $Mg^{2+}$ is 2 mM. In some embodiments, the $Mg^{2+}$ cations are provided as $Mg(OAc)_2$. In some embodiments, the $Mg^{2+}$ cations are provided as $MgCl_2$.

In further embodiments, the second enzyme cofactor is a polynucleotide transposase adaptor comprising a double-stranded transposon end sequence and a single-stranded tag region. In further embodiments, the second enzyme cofactor is a mixture of two polynucleotide transposase adaptors, and each adaptor comprises the same double-stranded transposon end sequence and a different single-stranded tag region.

In some embodiments, more complex electric fields may be applied, such as alternating the magnitude or direction of the electric field or providing different electric fields at 90 degrees to each other. In such an embodiment, more complex trajectories of individual reactants are possible. In such cases, reactants can be placed in predetermined locations within the matrix dependent on their known or expected mobilities such that reactants can be combined and/or separated by alternating the electrophoretic fields and moving molecules in chosen trajectories between positions on the gel matrix. In some embodiments, one or more reagents (such as enzymes) may be immobilized on a solid support (beads within the reaction portion) in the 3D matrix, thus preventing their movement in the electric fields, while other reagents are free to move according to their mobility within the electric fields.

In some embodiments, the method comprises varying a magnitude or a direction of the electric field across the electrophoresis gel matrix. In some embodiments, the method comprises varying a magnitude or a direction of the electric field across the electrophoresis gel matrix. In some embodiments, the electrophoresis system comprises additional portions along the width and the length, each containing different reagents. In some embodiments, a second pair of positive and negative electrodes may be provided at opposite sides of the width at one of the first end or the second end to apply an additional electric field. The electric fields generated by the first and second pairs of electrodes may be in different directions. The electric fields generated by the first and second pairs of electrodes may be perpendicular to each other.

FIG. 1A shows an example configuration of the electrophoresis system described herein to perform a chemical reaction according to some embodiments. Upon applying an electric field, two reagents, A and B (such as, but not limited to, a first enzyme cofactor and a second enzyme cofactor), migrate in opposite but facing directions from their starting positions at time t0, eventually combining after some time in the electric field (at t2) where they react with each other or with a third reagent to form product C. At a subsequent interval in time (t3) unreacted A and B continue to migrate in opposite directions but product molecule C, by virtue of its mobility, either remains or moves with different mobility than A and B and is thus purified of the unreacted reagents.

Figure 1B:
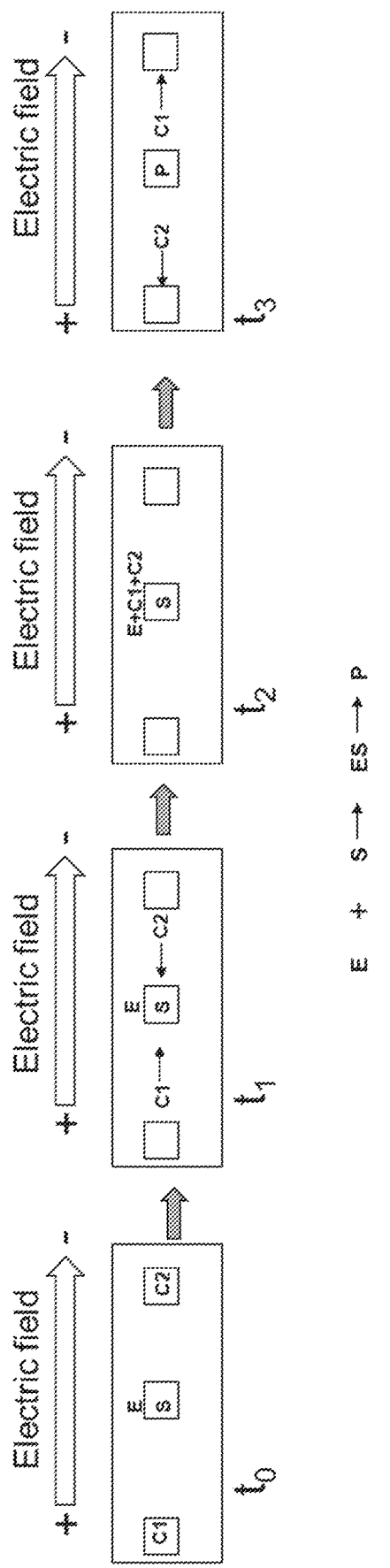
FIG. 1B illustrates the general schematics of performing an enzymatic reaction using gel electrophoresis. E: enzyme; S: substrate; C1, C2: enzyme cofactors; P: product.

FIG. 1B shows an example configuration of the electrophoresis system described herein to perform an enzymatic reaction according to some embodiments. The first enzyme cofactor C1 and the second enzyme cofactor C2 are provided in the first and second portions proximate to opposite ends of the electrophoresis gel matrix respectively. A reaction portion between the first portion and the second portion containing an enzyme E. Substrate S is further provided in the reaction portion. Upon applying an electric field, the first enzyme cofactor C1 and the second enzyme cofactor C2 migrate in opposite but facing directions from their starting positions at time t0. At t2 where they react with each other and the enzyme to form an activated enzyme complex comprising the enzyme, the first enzyme cofactor, and the second enzyme cofactor (E+C1+C2), which catalyzes a reaction of substrate S to form a product P. At a subsequent t3, unreacted C1 and C2 continue to migrate in opposite directions but product P, by virtue of its mobility, either remains or moves with different mobility than A and B and is thus purified of the unreacted reagents.

In some embodiments, a method of preparing a library of tagged nucleic acid fragments from a target double-stranded nucleic acid is provided. In some embodiments, the method comprises (a) providing an electrophoresis system comprising: an electrophoresis gel matrix having a first end and a second end, a width, and a length between the first and second ends; a first portion proximate to the first end and containing a first transposase cofactor, wherein the first transposase cofactor is a metallic ion; a reaction portion distant to the first end and containing a transposome complex comprising a transposase and a polynucleotide transposase adaptor comprising a double-stranded transposon end sequence and a single-stranded tag region; and a pair of positive and negative electrodes arranged at the first and second ends, respectively; (b) applying a target double-stranded nucleic acid to the reaction portion; (c) applying a first electric field between the pair of electrodes to drive the first transposase cofactor from the first portion into the reaction portion to form an activated transposome complex comprising the transposase, the polynucleotide transposase adaptor, and the first transposase cofactor; and (d) incubating the target double-stranded nucleic acid with the activated transposome complex in the reaction portion under conditions sufficient to fragment the target double-stranded nucleic acid not a plurality of nucleic acid fragments and tag the nucleic acid fragments, thereby generating a library of tagged nucleic acid fragments. In further embodiments, the transposome complex is immobilized on a solid support in the reaction portion. Optionally, the transposome complex is immobilized via streptavidin-biotin interaction. In further embodiments, the method further comprises releasing the transposome complex from the solid support after generating the tagged nucleic acid fragments. In further embodiments, the method further comprises varying the magnitude of the first electric field after step to drive the tagged nucleic acid fragments bound to the transposome complex released from the solid support into the collection.

Figure 2A:
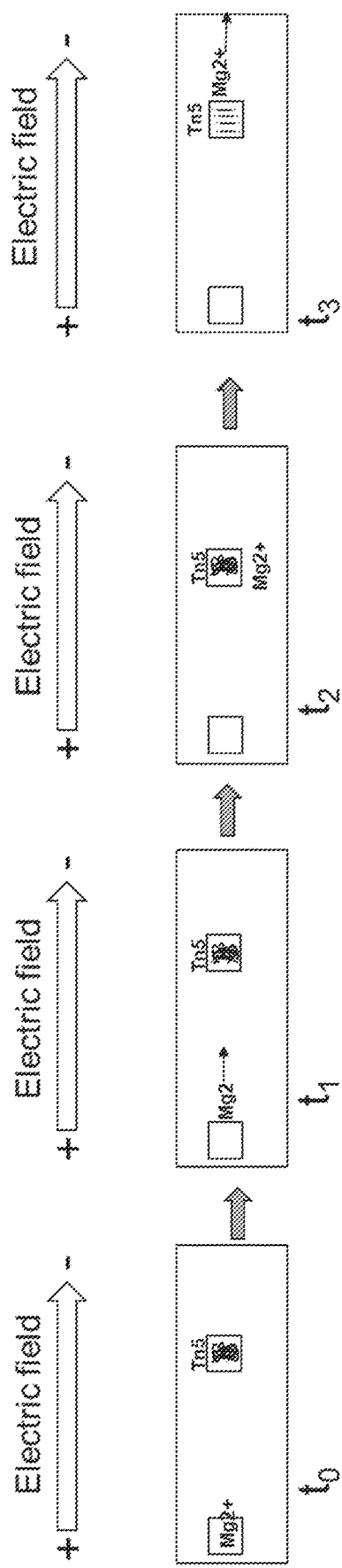
FIG. 2A illustrates an embodiment of the methods for preparing tagged nucleic acid fragments using gel electrophoresis. Tn5: transposome complex comprising a transposase (e.g., a Tn5 transposase) and a polynucleotide transposase adaptor.

FIG. 2A shows an example of the method performed using the electrophoresis device containing two wells. At the start, the first portion at the left contains a metallic ion such as $Mg^{2+}$, and the reaction portion in the center contains high molecular weight nucleic acid (e.g., DNA) and a transposome complex. On application of an electric field (t1), the $Mg^{2+}$ moves towards the negative electrode, and the contents of the reaction portion remain in place by virtue of their size and thus lack of mobility in the gel matrix. At a subsequent interval in time (t2), the $Mg^{2+}$ arrives at the reaction portion to form an activated transposome complex, and the activated complex then binds to, fragments, and tags (tagments) the large DNA molecules to small library templates. Upon completion of the reaction (t3), the $Mg^{2+}$ continues towards the negative electrode. The tagmented fragments can be collected or further processed in the reaction portion. Alternatively, by virtue of their greatly reduced size, the tagmented fragments can now migrate toward the positive electrode, thereby separating and optionally purifying the fragments, which can be collected from a collection portion (not shown).

In some embodiments, a method for preparing a library of tagged nucleic acid fragments from a target double-stranded nucleic acid is provided. The method comprises (a) providing an electrophoresis system comprising an electrophoresis gel matrix having a first end and a second end, a width, and a length between the first and second ends; a first portion proximate to the first end and containing a first transposase cofactor for a transposase, wherein the first transposase cofactor is a metallic ion; a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region; a reaction portion between the first portion and the second portion and containing the transposase; and a pair of positive and negative electrodes arranged at the first and second ends, respectively; (b) applying a target double-stranded nucleic acid to the reaction portion; (c) applying a first electric field between the pair of electrodes to drive the first transposase cofactor from the first portion into the reaction portion and drive the second transposase cofactor from the second portion into the reaction portion to form an activated transposome complex comprising the transposase, the first transposase cofactor, and the second transposase cofactor; and (d) incubating the target double-stranded nucleic acid with the activated transposome complex in the reaction portion under conditions sufficient to fragment the target double-stranded nucleic acid, not a plurality of nucleic acid fragments, and tag the nucleic acid fragments, thereby generating a library of tagged nucleic acid fragments.

In further embodiments, the metallic ion is $Mg^{2+}$, optionally in the form of $Mg(OAc)_2$ or $MgCl_2$. In some embodiments, the concentration of $Mg^{2+}$ is in a millimolar range. In some embodiments, the concentration of $Mg^{2+}$ is from 0.5 to 10 mM. In some embodiments, the concentration of $Mg^{2+}$ is from 1 to 10 mM. In some embodiments, the concentration of $Mg^{2+}$ is from 1 to 5 mM. In some embodiments, the concentration of $Mg^{2+}$ is 2 mM. In some embodiments, the $Mg^{2+}$ cations are provided as $Mg(OAc)_2$. In some embodiments, the $Mg^{2+}$ cations are provided as $MgCl_2$. Upon applying the target nucleic acid to the reaction portion in step (b), a transposase or transposome complex first binds to the target nucleic acid, in the absence of $Mg^{2+}$. When the electric field is applied in step (c), the transposase does not migrate as it is bound to the large target nucleic acid while $Mg^{2+}$ migrates into the reaction portion.

In some embodiments, the single-stranded tag region comprises one or more of a primer sequence, a barcode sequence, a unique molecular identifier (UMI) sequence, an amplification tag, an enrichment tag, or a purification tag.

In some embodiments, the transposase is a Tn5, MuA, or *Vibrio harveyi* transposase, or an active mutant thereof. In some embodiments, the transposase is a Tn5 transposase. In some embodiments, the Tn5 transposase is a hyperactive Tn5 transposase. In some embodiments, the transposase is immobilized on a solid support within the reaction portion. In some embodiments, the reaction portion comprises a well and the solid support is a bead particle in the well or the solid support is the surface of the well.

In some embodiments, the target double-stranded nucleic acid is double-stranded DNA, double-stranded RNA, or a DNA/RNA hybrid.

In some embodiments, when the first electric field is applied in step (c), the target double-stranded nucleic acid remains within the reaction portion due to its large size, thus lacking mobility in the gel matrix. In some embodiments, the first electric field applied in step (c) is set at a value at which the target double-stranded nucleic acid has substantially no electrophoretic mobility within the electrophoresis matrix.

In some embodiments, the electrophoresis system comprises a collection portion between the first portion and the reaction portion along the length. In further embodiments, applying the first electric field in step (c) comprises driving the tagged nucleic acid fragments into the collection portion. In further embodiments, the method comprises increasing the magnitude of the first electric field after step (d) to drive the tagged nucleic acid fragments into the collection portion.

In some embodiments, the method comprises varying a magnitude or a direction of the first electric field across the electrophoresis gel matrix. In some embodiments, the electrophoresis system comprises additional portions along the width and the length, each containing different reagents for tagmentation, and a second pair of positive and negative electrodes at opposite sides of the width at one of the first end or the second end. In some embodiments, the method comprises applying a second electric field between the second pair of electrodes, wherein the direction of second electric field is different from the direction of first electric field applied in step (c). In some embodiments, the method comprises applying a second electric field between the second pair of electrodes, wherein the direction of second electric field is perpendicular to the direction of first electric field applied in step (c).

In some embodiments, the electrophoresis system comprises a third portion containing a lysis reagent and the reaction portion contains whole cells. In some embodiments, the method further comprises applying a third electric field to drive the lysis agent into and/or through the reaction portion to lyse the cells, thereby applying the target double-stranded nucleic acid to the sample portion.

In some embodiments, applying a target double-stranded nucleic acid comprises adding a biological sample to the reaction portion. The biological sample can be any type that comprises nucleic acid (e.g., DNA) and which can be deposited onto the reaction portion for tagmentation. For example, the sample can comprise nucleic acid in a variety of states of purification, including purified nucleic acid. However, the sample need not be completely purified, and can comprise, for example, DNA mixed with protein, other nucleic acid species, other cellular components, and/or any other contaminant. In some embodiments, the biological sample comprises a mixture of DNA, protein, other nucleic acid species, other cellular components, and/or any other contaminant present in approximately the same proportion as found in vivo.

The biological sample can comprise, for example, a crude cell lysate or whole cells. For example, a crude cell lysate that is applied to a solid support in a method set forth herein, need not have been subjected to one or more of the separation steps that are traditionally used to isolate nucleic acids from other cellular components. Exemplary separation steps are set forth in Maniatis et al., Molecular Cloning: A Laboratory Manual, 2d Edition, 1989, and Short Protocols in Molecular Biology, ed. Ausubel, et al, hereby incorporated by reference.

Thus, in some embodiments, the biological sample can comprise, for example, blood, plasma, serum, lymph, mucus, sputum, urine, semen, cerebrospinal fluid, bronchial aspirate, feces, and macerated tissue, or a lysate thereof, or any other biological specimen comprising DNA.

Figure 2B:
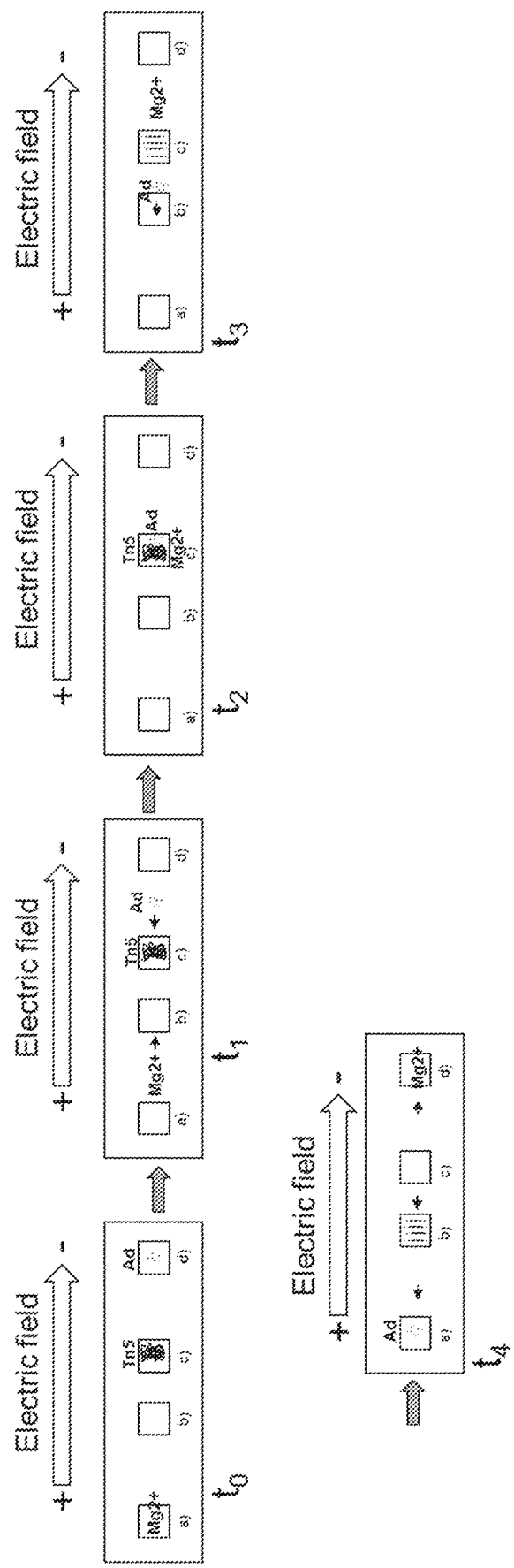
FIG. 2B illustrates another embodiment of the methods for preparing tagged nucleic acid fragments using gel electrophoresis. Tn5: transposase (e.g., a Tn5 transposase); Ad: polynucleotide transposase adaptor.

FIG. 2B shows an example of the method described herein using an electrophoresis system containing 4 wells a), b), c), and d) and a pair of electrodes. At the start of the process, well a) contains $Mg^{2+}$, b) is empty, c) contains high molecular weight DNA and transposase (e.g., Tn5 transposase), and d) contains a polynucleotide transposase adaptor (e.g., Nextera™ adaptors, Illumina). On application of an electric field (t1), the $Mg^{2+}$ moves towards the negative electrode, whereas the small adaptors move towards the positive electrode, and the contents of c) remain in place by virtue of their size and thus lack of mobility in the gel matrix. At a subsequent interval in time (t2), the adaptors and Mg', intersect at well c), forming an activated transposome complex comprising the transposase, Mg', and the adaptors. The activated transposome complex then binds to, fragments, and tags (tagments) the large DNA molecules to small library templates. Upon completion of the reaction (t3), the $Mg^{2+}$ continues towards the negative electrode. The tagmented fragments can be collected or further processed in the reaction portion. Alternatively, by virtue of their greatly reduced size, the tagmented fragments migrate toward the positive electrode, thereby separating and optionally purifying the fragments, which can be collected from well b) at a subsequent interval in time (t4).

In some embodiments, more complex electric fields may be applied, such as alternating the magnitude or direction of the electric field or providing different electric fields at 90 degrees to each other. In such an embodiment, more complex trajectories of individual reactants are possible. In such cases, reactants can be placed in predetermined locations within the matrix dependent on their known or expected mobilities such that reactants can be combined and/or separated by alternating the electrophoretic fields and moving molecules in chosen trajectories between positions on the gel matrix.

In some embodiments, a method of preparing a library of tagged nucleic acid fragments from a target double-stranded nucleic acid using more than one electric field is provided. In some embodiments, the method comprises: (a) providing an electrophoresis system comprising an electrophoresis gel matrix having a first end and a second end, a width, and a length between the first and second ends; and including a first portion, a second portion, a third portion, and a fourth portion; a first pair of positive and negative electrodes arranged at the first and second ends, respectively; and a second pair of positive and negative electrodes arranged at opposite sides of the width at one of the first end or the second end. The first portion contains a first transposase cofactor for a transposase. The first transposase cofactor is a metallic ion. The second portion contains a second transposase cofactor for the transposase. The second transposase cofactor has an electrical charge opposite to that of the first transposase cofactor. The second transposase cofactor is a polynucleotide transposase adaptor comprising a double-stranded transposon end sequence and a single-stranded tag region. The third portion contains a lysis reagent. The fourth portion contains the transposase. The system further comprises a reaction portion between the first portion and the second portion.

In some embodiments, the method further comprises (b) applying whole cells containing a target double-stranded nucleic acid to the reaction portion; (c) applying a first electric field to drive the lysis agent into and/or through the reaction portion to lyse the cells, thereby applying the target double-stranded nucleic acid to the sample portion; (d) applying a second electric field to drive the first transposase cofactor from the first portion into the reaction portion, drive the second transposase cofactor from the second portion into the reaction portion, and/or drive the transposase from the transposase portion to the reaction portion to form an activated transposome complex comprising the transposase, the first transposase cofactor, and the second transposase cofactor; and (e) incubating the target double-stranded nucleic acid with the activated transposome complex in the reaction portion under conditions sufficient to fragment the target double-stranded nucleic acid not a plurality of nucleic acid fragments and tag the nucleic acid fragments, thereby generating a library of tagged nucleic acid fragments.

In further embodiments, the first electric field and the second electric field are different, and step (c) is performed prior to step (d). In further embodiments, the first electric field and the second electric field are same, and step (c) is performed simultaneously with step (d). In further embodiments, the method comprises applying one or more electric fields following the generating of the library of tagged nucleic acid fragments to drive one or more of the lysis reagent, transposome complex, transposase, transposase adaptor, metallic ion, and tagged nucleic acid fragments out of the reaction portion. In some embodiments, the method further comprises driving the tagged nucleic acid fragments into a collection portion. In some embodiments, the method further comprises driving the lysis reagent, transposome complex, metallic ion, and tagged nucleic acid fragments out of the reaction portion and into separate receiver portions.

Figure 3A:
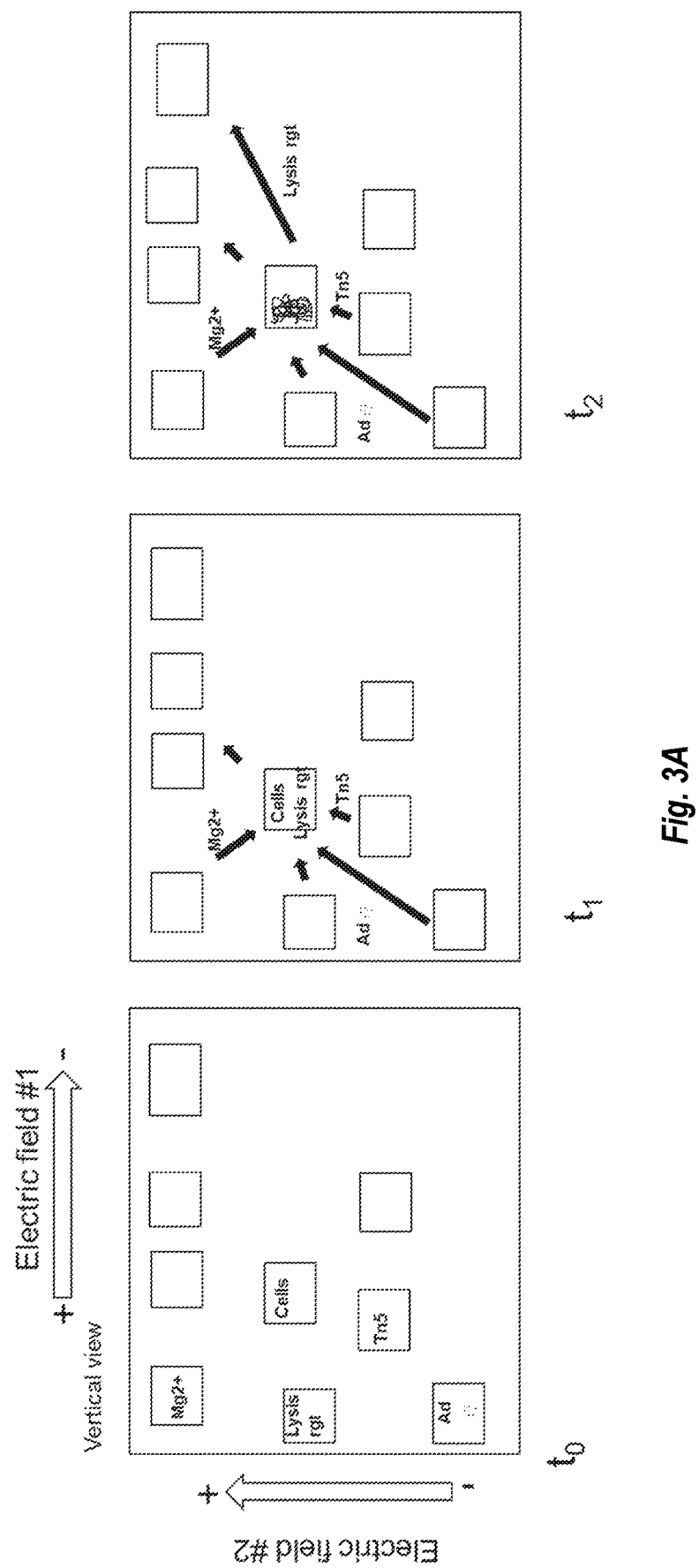
FIGS. 3A-3C illustrate another embodiment of the methods for preparing tagged nucleic acid fragments using gel electrophoresis, comprising multiple reaction portions in the gel matrix and performing multiple serial steps (t0-t5). Tn5: transposase (e.g., a Tn5 transposase); Ad: polynucleotide transposase adaptor; Lysis rgt: lysis reagent.
Figure 3B:
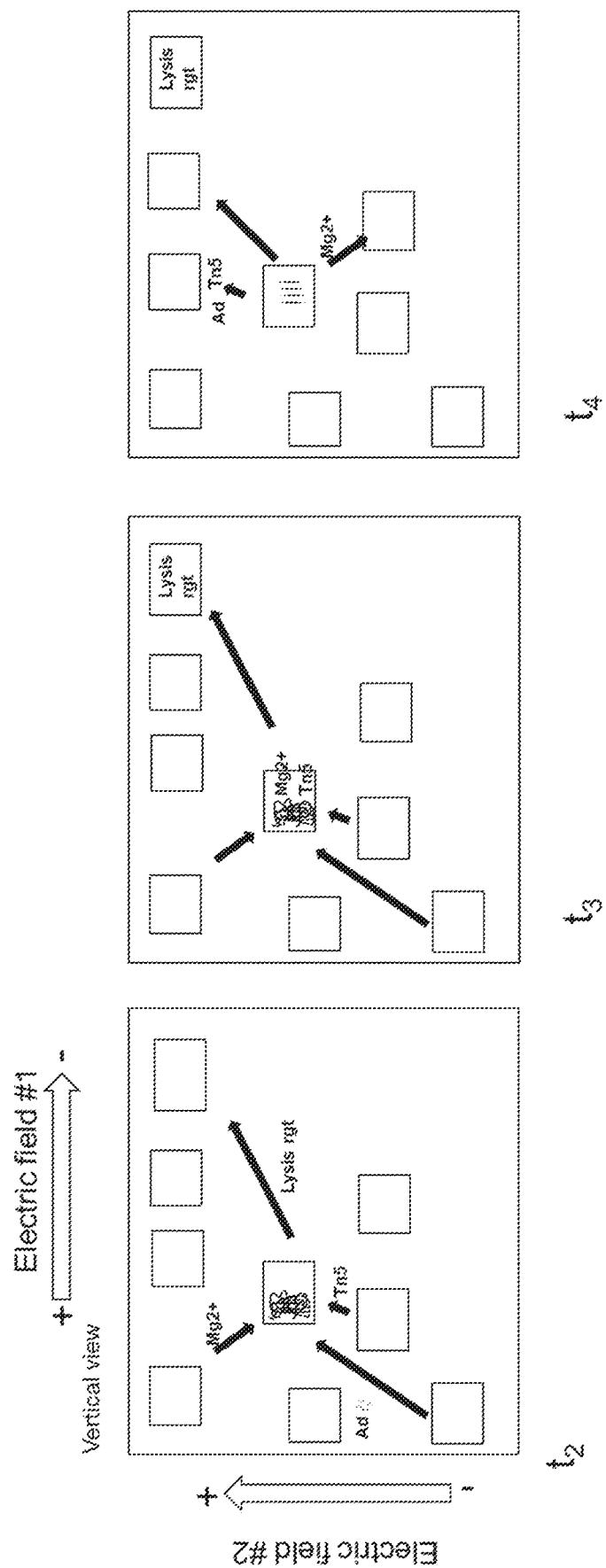
Figure 3C:
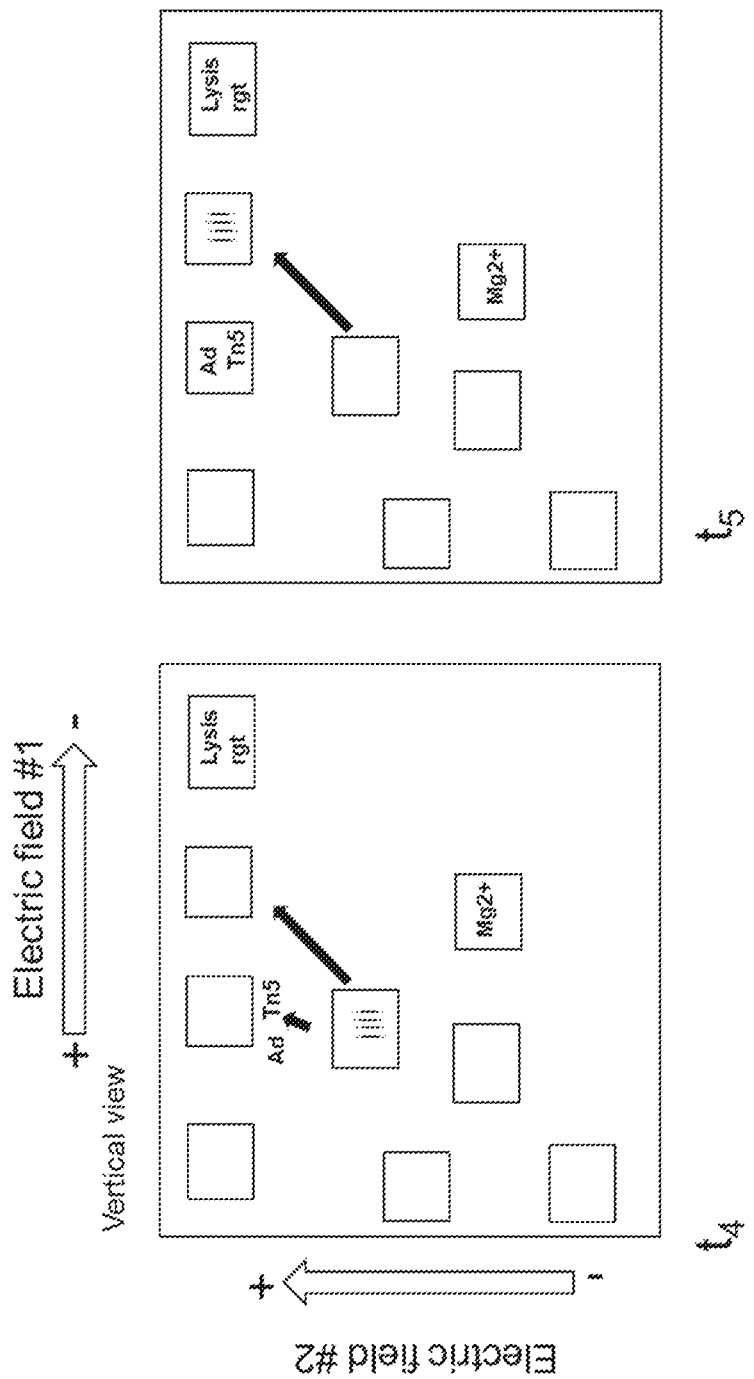

FIGS. 3A-3C illustrate an embodiment of the method described herein. An electrophoresis system is provided with $Mg^{2+}$, a transposase (e.g., a Tn5 transposase), adaptors and lysis reagents placed in wells at the beginning t0. A sample (e.g., cells having a target high molecular weight DNA) is loaded in the reaction portion. Two alternating electric fields at 90 degrees to each other are applied in a controlled manner, thus commencing the movement of reagents and substrates through the gel matrix. At a subsequent interval in time (t1), lysis reagents arrive at the reaction portion and combine with the sample to lyse the cells. Simultaneously, other reagents migrate according to their mobility towards the reaction portion. At a subsequent interval in time (t2), the lysis reagents migrate away from the reaction portion, leaving behind purified high molecular weight DNA. At a subsequent interval in time (t3), the tagmentation reagents (transposase (e.g., Tn5 transposase), $Mg^{2+}$ and adaptors) enter the sample well to form an activated complex, which then binds to, fragments, and tags (tagments) the target DNA. At a subsequent interval in time (t4), the tagmentation reagents further migrate leaving behind purified tagmented library templates. The tagmented fragments can be collected of further processed in the reaction portion. Alternatively, at a subsequent interval in time (t5), the tagmented library templates further migrate to a sample collection well.

In some embodiments, transposome complexes bind target nucleic acid and generate nicks in the backbone, 9 bases apart on either strand. In other embodiments, the transposome generates a gap of 7, 8, 9, 10, 11, or 12 bps between nicks. In some embodiments, the method further comprises filling gaps and ligating nicks in the nucleic acid fragments. Any known ligase capable of sealing a nick (a juxtaposed 5' phosphate end and 3'OH) may be used. The ligase may be provided in a second reaction portion, the second reaction portion being the same as or different from the reaction portion for tagmentation.

In some embodiments, filling gaps and ligating nicks in the nucleic acid fragments comprises incubating tagged fragments with a strand-displacing polymerase under conditions and for sufficient time wherein the gaps in the tagged fragments are filled. In some embodiments, filling gaps and ligating nicks in the nucleic acid fragments comprises incubating tagged fragments with a non-strand displacing polymerase to extend over the gap and then with a ligase under conditions and for sufficient time wherein the single-stranded gaps in the tagged fragments are filled.

In some embodiments, the method further comprises amplification of the nucleic acid fragments produced. The nucleic acid fragments produced by transposome mediated tagmentation can be amplified according to any suitable amplification methods known in the art. In some embodiments, the amplifying comprises use of one or more of a nucleic acid amplification reaction, a strand-displacement amplification, a rolling circle amplification (RCA), a ligase chain reaction, a transcription-mediated amplification, or a loop-mediated amplification.

In some embodiments, the processed nucleic acid fragments may be barcoded to preserve the contiguity of the sequencing information from the target nucleic acid. As used herein the term "contiguity" refers to a spatial relationship between two or more DNA fragments based on shared information. The shared aspect of the information can be with respect to adjacent, compartmental and distance spatial relationships. Information regarding these relationships in turn facilitates hierarchical assembly or mapping of sequence reads derived from the DNA fragments. In some embodiments, the single-stranded tag region of the polynucleotide transposase adaptor further comprises a barcode sequence. In some embodiments, the methods described herein further comprise contacting the tagged fragments with a solid support-bound barcode sequence to transfer the barcode sequence information to the target nucleic acid fragments. In some embodiments, the barcode sequence is added while the fragment remains bound to the transposase. The contiguity information of the target nucleic acid is determined by identifying the barcode sequences. Exemplary preparations of barcoded fragments of a target nucleic acid that can be readily adapted for use with the methods of the present application are described, for example, in US 2019/0040382, WO2014142850A1, and WO 2014/108810, each of which is incorporated herein by reference in its entirety.

When whole cells are applied to a reaction sample, nucleic acid extraction and processing are performed before tagmentation, which require use of additional reagents. Non-limiting examples of reagents for such pre-processing include lysis agents; solutions containing enzymes for digesting bacterial, fungal, or plant cell walls; protease solutions; and solutions containing DNA processing enzymes. In some embodiments, they may be loaded at one or more different locations of the gel matrix. In some embodiments, the system may be configured so that a series of reagents are serially added and removed from a single location. The addition and removal of the reagents may be added and removed from the top of the container by standard liquid handling means (such as, for instance, a gantry-style liquid handling robots sold by Beckman, Agilent, Tecan, Hamilton, etc.). In other embodiments, the addition and removal of the reagents may be accomplished via fluidic channels within the container.

In some embodiments, the transposases of transposome complexes are removed from the nucleic acid fragments after transposition. In some embodiments, transposases are removed from the nucleic acid fragments after transposition and after subsequent hybridization of the adaptor sequences of the transposon to a complementary capture sequence. In some embodiments, the transposases are removed by SDS treatment. In some embodiments, the transposases are removed by proteinase treatment.

In some embodiments, the processed nucleic acid fragments may be transferred out of the electrophoresis gel matrix for analysis or for other library preparation processes, such as, for example, size selection, such as processes described in U.S. Pat. Nos. 8,361,298 and 8,361,299, both of which are hereby incorporated by reference in their entireties.

In some embodiments, the processed nucleic acid fragments produced by transposome-mediated tagmentation may be collected and sequenced according to any suitable sequencing methodology, such as direct sequencing, including sequencing by synthesis, sequencing by ligation, sequencing by hybridization, nanopore sequencing and the like. In some embodiments, fragments of a desired size or size range (e.g., 25 to 500 base pairs (bp), or 50 to 500 bp, or 50 to 350 bp, or 100 to 300 bp, or around 50, 150, 250, or 300 bp) can be selectively collected in a collection portion. Upon application of the electric field, the processed nucleic acid fragments may further migrate out of the reaction portion. As fragments of different sizes have different mobilities, fragments of a desired size or size range can be selectively separated and collected from a collection portion.

In some embodiments, a method for performing multiple sequential chemical and/or enzymatic processes is provided. In some embodiments, more complex electric fields may be applied, such as alternating the magnitude or direction of the electric field or providing different electric fields at 90 degrees to each other. In such an embodiment, more complex trajectories of individual reactants are possible. In such cases, reactants can be placed in predetermined locations within the matrix dependent on their known or expected mobilities such that reactants can be combined and/or separated by alternating the electrophoretic fields and moving molecules in chosen trajectories between positions on the gel matrix. In some embodiments, one or more reagents (such as enzymes) may be immobilized on a solid support (beads within the reaction portion) in the 3D matrix, thus preventing their movement in the electric fields, while other reagents are free to move according to their mobility within the electric fields.

Figure 4:
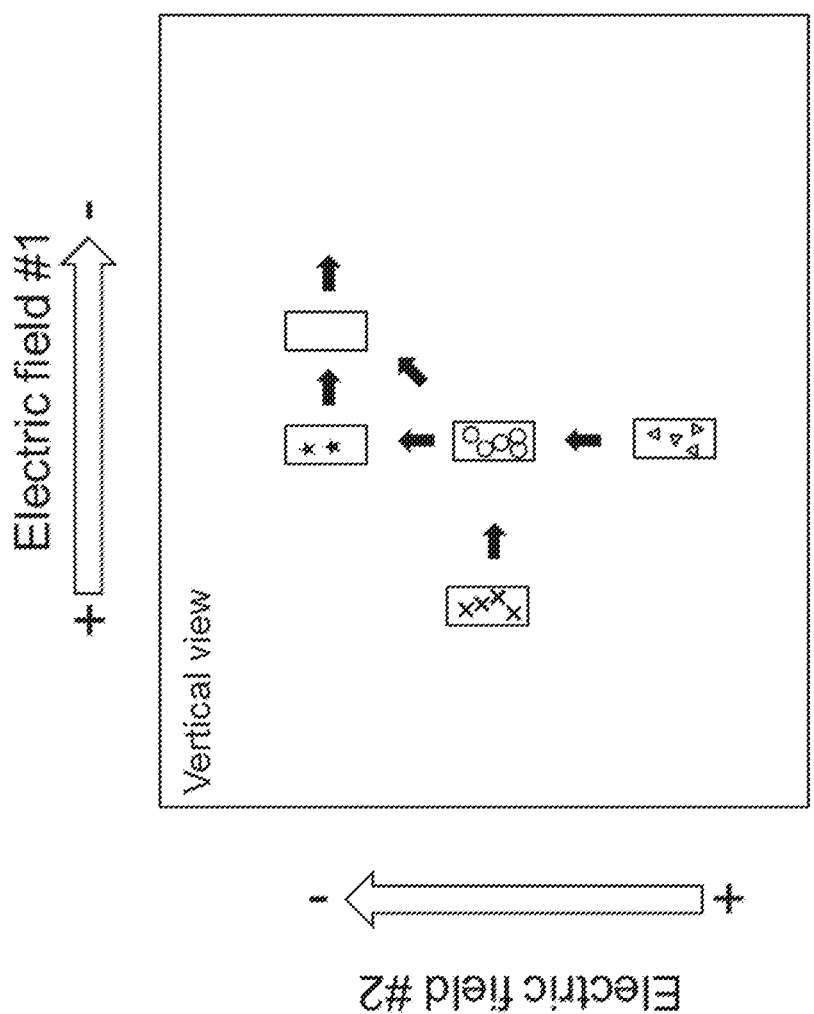
FIG. 4 shows the general schematics of performing multiple biochemical reactions in multiple reagents having different electrophoretic mobilities placed in different portions of the gel matrix.

FIG. 4 illustrates a general schematic of the method of performing multiple biochemical reactions using gel electrophoresis. The electrophoresis device comprises a plurality of portions along the width and the length, each containing different reagents. Two pairs of positive and negative electrodes are provided at opposite sides of the width at one of the first end or the second end to apply alternating electric fields perpendicular each other. The reagents migrate into a first reaction portion to perform a first biochemical reaction. By varying magnitudes or directions of the electric field(s), the product from the first biochemical reaction migrates into a second reaction portion and reacts with a reagent to perform a second biochemical reaction. These steps can be repeated for subsequent biochemical reactions in additional reaction portions.

Devices/Systems

In some embodiments, an electrophoresis system for performing an enzymatic reaction is provided. In some embodiments, the electrophoresis system comprises: an electrophoresis gel matrix having a first end and a second end and a length between the first and second ends; a first portion proximate to the first end and containing a first enzyme cofactor for an enzyme; a second portion proximate to the second end and containing a second enzyme cofactor for the enzyme, the second enzyme cofactor having an electrical charge opposite to that of the first enzyme cofactor; a reaction portion between the first portion and the second portion and containing the enzyme; and a pair of positive and negative electrodes arranged at the first and second ends, respectively. In further embodiments, a substrate for the enzyme is provided in the reaction portion.

In some embodiments, an electrophoresis device is provided, and the device comprises: an electrophoresis gel matrix having a first end and a second end, a width, and a length between the first and second ends; a first portion proximate to the first end and containing a first transposase cofactor, wherein the first transposase cofactor is a metallic ion; a reaction portion distant to the first end and containing a transposome complex comprising a transposase and a polynucleotide transposase adaptor comprising a double-stranded transposon end sequence and a single-stranded tag region; and a pair of positive and negative electrodes arranged at the first and second ends, respectively.

In some embodiments, an electrophoresis device is provided, and the device includes an electrophoresis gel matrix having a first end, a second end, and a length between the first and second ends; a first portion proximate to the first end; a second portion proximate to the second end; a reaction portion between the first end and the second end; and a pair of positive and negative electrodes arranged at the first and second ends, respectively. The first portion contains a first transposase cofactor for a transposase. In some embodiments, the first transposase cofactor is a metallic ion. The second portion contains a second transposase cofactor for the transposase, and the second transposase cofactor having an electrical charge opposite to that of the first transposase cofactor. In some embodiments, the second transposase cofactor is a polynucleotide transposase adaptor comprising a double-stranded transposon end sequence and a single-stranded tag region. The reaction portion contains the transposase. In some embodiments, a target nucleic acid is provided in the reaction portion.

In some embodiments, an electrophoresis device is provided, and the device includes an electrophoresis gel matrix having a first end, a second end, and a length between the first and second ends; a first portion; a second portion; a third portion, and a fourth portion; a reaction portion; a first pair of positive and negative electrodes arranged at the first and second ends, respectively; and a second pair of positive and negative electrodes arranged at opposite sides of the width at one of the first end or the second end. The first portion contains a first transposase cofactor for a transposase, and the first transposase cofactor is a metallic ion. The second portion contains a second transposase cofactor for the transposase, the second transposase cofactor having an electrical charge opposite to that of the first transposase cofactor. The second transposase cofactor is a polynucleotide transposase adaptor comprising a double-stranded transposon end sequence and a single-stranded tag region. The third portion contains a lysis reagent. In some embodiments, whole cells containing a target nucleic acid are provided in the reaction portion. In some embodiments, the device includes additional portions along the width and/or the length, each containing different reagents for tagmentation. In some embodiments, the device includes a collection portion to receive the tagged nucleic acid fragments. In some embodiments, the device includes one or more receiver portions to receive the unreacted regents.

In some embodiments, the first portion, the second portion, the third portion, the fourth portion, the reaction portion and/or additional portions comprise a well. The well may contain enzymes, target nucleic acid molecules or any other substrate or reagents. In some embodiments, the reaction portion comprises a well and the solid support is a bead particle in the well or the solid support is the surface of the well.

In some embodiments, the electrophoresis device may include a container having an electrophoresis buffer and configured to hold the electrophoresis gel matrix therein. In some embodiments, the electrophoresis device may include more than one container described herein.

The electrophoresis gel matrix may be agar, agarose, or polyacrylamide. In some embodiments, the electrophoresis gel matrix is agarose. The electrophoresis buffer may have a pH between pH 7 and pH 9, and it may comprise EDTA as a chelating agent. When the target nucleic acid is fragmented into sizes ranging from several hundred to several thousand bp in length, a higher concentration of agarose in the reaction portion will help restrict diffusion of the library products from the reaction portion while allowing the free reagents/adaptors to be removed efficiently.

In some embodiments, the electrophoresis device may also comprise one or more pairs of positive electrode and negative electrode. In some embodiments, the pair of positive and negative electrodes are in direct contact with the electrophoresis gel matrix. In some embodiments, one or more of the electrodes are embedded in the gel matrix. In some embodiments, the pair of positive and negative electrodes are not in direct contact with the electrophoresis gel matrix. In some embodiments, one or more of the electrodes are embedded in the chambers filled with electrophoresis buffer fluidically connected the with electrophoresis gel matrix.

In some embodiments, the electrophoresis device may also include a barrier or an ultrafiltration membrane of a pore-size small enough to retain the nucleic acid fragments. One such exemplary membrane is a polyethersulfone membrane with a 10 kDa molecular weight cutoff (Biomax® 10 kDa from EMD Millipore).

In some embodiments, an electrophoresis system is provided. In some embodiments, an electrophoresis system for preparing a library of tagged nucleic acid fragments from a target double-stranded nucleic acid is provided. In some embodiments, the electrophoresis system comprises the electrophoresis device described herein, a power supply, and a controller configured to control direction and/or magnitude of one or more electric fields to drive the reagents and/or tagged nucleic acid fragments into and/or through the reaction portion, collection portion, and/or receiver portions.

When a voltage is applied across the electrodes, the reagents may be driven through the electrophoresis gel matrix and into and through the reaction portion. Reversing the voltage may direct the molecules in the opposite direction. Furthermore, when applying a voltage across one and/or another of the pairs of electrodes, the reagents are driven into one and/or another of respective reaction portion or collection portion, dependent on their electrophoretic mobilities.

In some embodiments, the electric field may be manipulated to selectively recover reagents and nucleic acid fragments in certain size ranges. For instance, pulsed field methods may be used to elute processed nucleic acid fragments 50-500 kb in length while leaving nucleic acid fragments greater than about 2000 kb in size. If the larger size fragment is desired free of the lower size fragment, the lower fraction can be eluted first under size-selective pulsed field conditions, and subsequently the higher fraction can be recovered under other pulsed field conditions or under continuous field conditions. For more, see Jann Noolandi, and Chantal Turmel in In Methods in Molecular Biology Volume 12: Pulsed-field gel electrophoresis, Protocols, Methods, and Theories. Ed. Burmeister, Margit, and Ulanovsky, Levy. Humana., pp. 73-103 and 135-143, which is hereby incorporated by reference in its entirety.

Further, gel concentration, voltage, and/or electrophoresis duration may be chosen so that the reagent components are efficiently moved and/or so that the target nucleic acid remains in the reaction portion. Such conditions are fulfilled for very high molecular weight nucleic acid that migrates so slowly in agarose gel. When dealing with a shorter target nucleic acid (e.g., about 500 bp fragment size), higher concentration gels, lower voltages, and more optimization may be used.

Definitions

Unless defined otherwise, all technical and scientific terms used herein have the same meaning as is commonly understood by one of ordinary skill in the art. All patents, applications, published applications and other publications referenced herein are incorporated by reference in their entirety unless stated otherwise. In the event that there are a plurality of definitions for a term herein, those in this section prevail unless stated otherwise. As used in the specification and the appended claims, the singular forms "a," "an" and "the" include plural referents unless the context clearly dictates otherwise. The use of "or" or "and" means "and/or" unless stated otherwise. Furthermore, use of the term "including" as well as other forms, such as "include", "includes," and "included," is not limiting. As used in this specification, whether in a transitional phrase or in the body of the claim, the terms "comprise(s)" and "comprising" are to be interpreted as having an open-ended meaning. That is, the terms are to be interpreted synonymously with the phrases "having at least" or "including at least." When used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

Target Nucleic Acid

As used herein, "target nucleic acid" refers to any double-stranded nucleic acid of interest that is subjected to transposition, e.g., for generating a library of tagged nucleic acid fragments (e.g., 5'- and 3'-tagged or di-tagged linear ssDNA or dsDNA fragments or tagged circular ssDNA fragments). "Target nucleic acid" can be derived from any in vivo or in vitro source, including from one or multiple cells, tissues, organs, or organisms, whether living or dead, or from any biological or environmental source (e.g., water, air, soil). For example, in some embodiments, the target nucleic acid comprises or consists of eukaryotic and/or prokaryotic double-stranded nucleic acid that originates or that is derived from humans, animals, plants, fungi (e.g., molds or yeasts), bacteria, viruses, viroids, mycoplasma, or other microorganisms. In some embodiments, the target nucleic acid comprises or consists of genomic DNA, subgenomic DNA, chromosomal DNA (e.g., from an isolated chromosome or a portion of a chromosome, e.g., from one or more genes or loci from a chromosome), mitochondrial DNA, chloroplast DNA, plasmid or other episomal-derived DNA (or recombinant DNA contained therein), or double-stranded cDNA made by reverse transcription of RNA using an RNA-dependent DNA polymerase or reverse transcriptase to generate first-strand cDNA and then extending a primer annealed to the first-strand cDNA to generate dsDNA. In some embodiments, the target nucleic acid comprises multiple dsDNA molecules in or prepared from nucleic acid molecules (e.g., multiple dsDNA molecules in or prepared from genomic DNA or cDNA prepared from RNA in or from a biological (e.g., cell, tissue, organ, organism) or environmental (e.g., water, air, soil, saliva, sputum, urine, feces) source. In some embodiments, the target nucleic acid is from an in vitro source. For example, in some embodiments, the target nucleic acid comprises or consists of dsDNA that is prepared in vitro from single-stranded DNA (ssDNA) or from single-stranded or double-stranded RNA (e.g., using methods that are well-known in the art, such as primer extension using a suitable DNA-dependent and/or RNA-dependent DNA polymerase (reverse transcriptase). In some embodiments, the target nucleic acid is a target DNA that comprises or consists of dsDNA that is prepared from all or a portion of one or more double-stranded or single-stranded DNA or RNA molecules using any methods known in the art, including methods for: DNA or RNA amplification (e.g., PCR or reverse-transcriptase-PCR (RT-PCR), transcription-mediated amplification methods, with amplification of all or a portion of one or more nucleic acid molecules); molecular cloning of all or a portion of one or more nucleic acid molecules in a plasmid, fosmid, BAC or other vector that subsequently is replicated in a suitable host cell; or capture of one or more nucleic acid molecules by hybridization, such as by hybridization to DNA probes on an array or microarray (e.g., by "sequence capture"; e.g., using kits and/or arrays from ROCHE NIMBLEGEN, AGILENT, or FEBIT).

In some embodiments, "target nucleic acid" or "target DNA" means double stranded nucleic acid that is prepared or modified (e.g., using various biochemical or molecular biological techniques) prior to being used for generating a library of tagged nucleic acid fragments (e.g., 5'- and 3'-tagged or di-tagged linear ssDNA or dsDNA fragments or tagged circular ssDNA fragments).

Transposome Complexes, Polynucleotide Transposase Adaptors, Tags, and Transposases Transposon based technology can be utilized for fragmenting nucleic acid (e.g., DNA), for example, as exemplified in the workflow for NEXTERA™ XT and FLEX DNA sample preparation kits (Illumina, Inc.), wherein target nucleic acids, such as genomic DNA, are treated with transposome complexes that simultaneously fragment and tag ("tagmentation") the target, thereby creating a population of fragmented nucleic acid molecules tagged with unique adaptor sequences at the ends of the fragments.

A transposition reaction is a reaction wherein one or more transposons are inserted into target nucleic acids at random sites or almost random sites. Components in a transposition reaction include a transposase (or other enzyme capable of fragmenting and tagging a nucleic acid as described herein, such as an integrase) and a polynucleotide transposase adaptor that includes a double-stranded transposon end sequence that binds to the enzyme, and tag attached to one or both of the two transposon end strands. One strand of the double-stranded transposon end sequence is transferred to one strand of the target nucleic acid at the fragmentation site (transferred strand) and the complementary transposon end sequence strand is not covalently bound to the fragmented nucleic acid (non-transferred strand), but remains hybridized to the transferred strand. The polynucleotide transposase adaptor can comprise a tag with one or more functional sequences (e.g., primer sequences) as needed or desired.

A "transposome complex" is comprised of at least one transposase enzyme and a transposon recognition sequence. In some such systems, the transposase binds to a transposon recognition sequence to form a functional complex that is capable of catalyzing a transposition reaction. In some aspects, the transposon recognition sequence is a double-stranded transposon end sequence. The transposase, or integrase, binds to a transposase recognition site in a target nucleic acid and inserts the transposon recognition sequence into a target nucleic acid. In some such insertion events, one strand of the transposon recognition sequence (or end sequence) is transferred into the target nucleic acid, resulting also in a cleavage event. Exemplary transposition procedures and systems that can be readily adapted for use with the transposases of the present disclosure are described, for example, in PCT Publ. No. WO2010/048605, U.S. Pat. Publ. No. 2012/0301925, U.S. Pat. Publ. No. 2012/13470087, or U.S. Pat. Publ. No. 2013/0143774, each of which is incorporated herein by reference in its entirety.

Exemplary transposases that can be used with certain embodiments provided herein include (or are encoded by): Tn5 transposase (see Reznikoff et al., Biochem. Biophys. Res. Commun. 2000, 266, 729-734), *Vibrio harveyi* (transposase characterized by Agilent and used in SureSelect QXT product), MuA transposase and a Mu transposase recognition site comprising R1 and R2 end sequences (Mizuuchi, K., Cell, 35: 785, 1983; Savilahti, H, et al., EMBO J., 14:4893, 1995), *Staphylococcus aureus* Tn552 (Colegio, O. et al., J. Bacteriol., 183:2384-8, 2001; Kirby, C. et al., Mol. Microbiol., 43:173-86, 2002), Ty1 (Devine & Boeke, Nucleic Acids Res., 22:3765-72, 1994 and PCT Publ. No. WO95/23875), Transposon Tn7 (Craig, N. L., Science, 271:1512, 1996; Craig, N. L., Curr. Top. Microbiol. Immunol., 204:27-48, 1996), Tn/O and IS10 (Kleckner N. et al., Curr. Top. Microbiol. Immunol., 204:49-82, 1996), Mariner transposase (Lampe, D. J. et al., EMBO J., 15:5470-9, 1996), Tc1 (Plasterk, R. H., Curr. Top. Microbiol. Immunol., 204:125-43, 1996), P Element (Gloor, G. B., Methods Mol. Biol., 260:97-114, 2004), Tn3 (Ichikawa & Ohtsubo, J. Biol. Chem., 265:18829-32, 1990), bacterial insertion sequences (Ohtsubo & Sekine, Curr. Top. Microbiol. Immunol. 204:1-26, 1996), retroviruses (Brown et al., Proc. Natl. Acad. Sci. USA, 86:2525-9, 1989), and retrotransposon of yeast (Boeke & Corces, Ann. Rev. Microbiol. 43:403-34, 1989). More examples include IS5, Tn10, Tn903, IS911, and engineered versions of transposase family enzymes (Zhang et al., (2009) PLoS Genet. 5:e1000689. Epub October 16; Wilson C. et al. (2007) J. Microbiol. Methods 71:332-5).

In some embodiments, the transposase is a Tn5, MuA, or *Vibrio harveyi* transposase, or an active mutant thereof. In other embodiments, the transposase is a Tn5 transposase or an active mutant thereof. In some embodiments, the Tn5 transposase is a hyperactive Tn5 transposase (see, e.g., Reznikoff et al., PCT Publ. No. WO2001/009363, U.S. Pat. Nos. 5,925,545, 5,965,443, 7,083,980, and 7,608,434, and Goryshin and Reznikoff, J. Biol. Chem. 273:7367, 1998), or an active mutant thereof. In some aspects, the Tn5 transposase is a Tn5 transposase as described in PCT Publ. No. WO2015/160895, which is incorporated herein by reference. In some embodiments, the Tn5 transposase is a fusion protein. In some embodiments, the Tn5 transposase fusion protein comprises a fused elongation factor Ts (Tsf) tag. In some embodiments, the Tn5 transposase is a hyperactive Tn5 transposase comprising mutations at amino acids 54, 56, and 372 relative to the wild type sequence. In some embodiments, the hyperactive Tn5 transposase is a fusion protein, optionally wherein the fused protein is elongation factor Ts (Tsf). The methods described herein could also include combinations of transposases, and not just a single transposase. In some embodiments, the recognition site is a Tn5-type transposase recognition site (Goryshin and Reznikoff, J. Biol. Chem., 273:7367, 1998). In one embodiment, a transposase recognition site that forms a complex with a hyperactive Tn5 transposase is used (e.g., EZ-Tn5™ Transposase, Epicentre Biotechnologies, Madison, Wis.).

In some embodiments, the transposase enzyme is a dimer (e.g., a Tn5 transposase dimer). In some such embodiments, the transposome complex comprises a dimer of two molecules of a transposase. In some embodiments, the transposase complex comprises a transposase (e.g., a Tn5 transposase) dimer comprising a first and a second monomer. Each monomer comprises a first transposon and a second transposon, where the first transposon comprises a first transposon end sequence at its 3' end and a first adaptor sequence (where the adaptor sequences in each monomer of a dimer are the same or different), and the second transposon comprises a second transposon end sequence at least partially complementary to the first transposon end sequence. In some embodiments, the transposome complex is a homodimer, wherein two molecules of a transposase are each bound to a polynucleotide adaptor sequence with the same transposon end sequence and tag (e.g., each monomer is bound to a molecule of the same polynucleotide adaptor sequence, forming a "homodimer"). In some embodiments, the compositions and methods described herein employ two populations of transposome complexes. In some embodiments, the transposases in each population are dimers and are the same enzyme. In some embodiments, the transposome complexes in each population are heterodimers, wherein the first population has a first polynucleotide transposase adaptor in each of the two monomers and the second population has a second polynucleotide adaptor (that is different from the first polynucleotide transposase adaptor) in each monomer. In some embodiments, the transposon end sequence in each heterodimer is the same, but the polynucleotide transposase adaptors comprise different tags. In some embodiments, each population comprises a different tag sequence. In some embodiments, a first population comprises an adaptor with a tag comprising an A14 primer sequence and a second population comprises an adaptor with a tag comprising a B15 primer sequence.

In some embodiments, the polynucleotide transposase adaptor is a mixture of two polynucleotide transposase adaptors, each comprising the same transposon end sequence and a different tag. When the mixture of adaptors combines with Tn5 transposase dimer, a mixture of three transposome complexes results: (a) a first transposome dimer complex comprising a transposase and two of the first polynucleotide transposase adaptors (first homodimer); (b) a second transposome dimer complex comprising a transposase and two of the second polynucleotide transposase adaptors (second homodimer); and (c) a third transposome dimer complex comprise a transposase and one monomer with the first adaptor and one monomer with the second adaptor (heterodimer). When tagmentation is carried out with this mixture of three complexes, the fragments that are produced are tagged accordingly, yielding three populations of fragments (one tagged at each 5' end with the first adaptor; a second tagged at each 5' end with the second adaptor; and a third tagged at one 5' end with the first adaptor and at the second 5' end with the second adaptor).

Transposase adaptors include (a) a 3' portion comprising a double-stranded transposon end sequence and (b) a tag. The transposon end sequence is recognized by the transposase. Binding of the transposase to the transposon end sequence generates the transposome complex. During tagmentation, a transferred strand of the transposase adaptor is transferred to (annealed to) the 5' end of a double-stranded nucleic acid fragment. The complementary, non-transferred strand is not covalently bound to the resulting fragment, but is hybridized to the transferred strand and is thus included in the product fragment.

The terms "tag" and "tag region" as used herein refer to a portion of a polynucleotide transposase adaptor that exhibits a sequence for a desired intended purpose or application. Some embodiments presented herein include a transposome complex comprising a polynucleotide transposase adaptor having a 3' portion comprising a double-stranded transposon end sequence, and a tag region. Tag regions can comprise any sequence provided for any desired purpose. In some embodiments, a tag comprises one or more functional sequences selected from the group consisting of universal sequences, primer sequences, index sequences, capture sequences, barcode sequences (used, e.g., for counting or error correction), cleavage sequences, sequencing-related sequences, sequences for enrichment, and combinations thereof. For example, in some embodiments, a tag region comprises one or more restriction endonuclease recognition sites. In some embodiments, a tag comprises a primer sequence. In other embodiments, a tag comprises a primer sequence and an index or barcode sequence. A primer sequence may also be a universal sequence. A universal sequence is a region of nucleotide sequence that is common to two or more nucleic acid fragments. Optionally, the two or more nucleic acid fragments also have regions of sequence differences. A universal sequence that may be present in different members of a plurality of nucleic acid fragments can allow for the replication or amplification of multiple different sequences using a single universal primer that is complementary to the universal sequence.

In some embodiments, a tag region comprises one or more regions suitable for hybridization with a primer for a cluster amplification reaction. In some embodiments, a tag region comprises one or more regions suitable for hybridization with a primer for a sequencing reaction. It will be appreciated that any other suitable feature can be incorporated into a tag region. In some embodiments, the tag region comprises a sequence having a length between 5 and 200 bp. In some embodiments, the tag region comprises a sequence having a length between 10 and 100 bp. In some embodiments, the tag region comprises a sequence having a length between 20 and 50 bp. In some embodiments, the tag region comprises a sequence having a length between 5, 6, 7, 8, 9, 10, 20, 30, 40, 50, 60, 70, 80, 90, 100, 150 and 200 bp. This disclosure is not limited to the type of tags that could be used and a skilled artisan will recognize additional sequences which may be of use for library preparation and next generation sequencing.

Immobilized Reagents

In some embodiments, reagents such as enzymes may be immobilized on surfaces such as beads within positions or wells in the gel matrix, thus preventing their movement in the electric fields, while other reagents are free to move according to their mobility within the electric fields.

When referring to immobilization of molecules to a solid support, the terms "immobilized" and "attached" are used interchangeably herein and both terms are intended to encompass direct or indirect, covalent or non-covalent attachment, unless indicated otherwise, either explicitly or by context. In certain embodiments, covalent attachment may be preferred.

Immobilization of reagents may be achieved by other methods known in the art. In some embodiments, a transposase or transposome complex is immobilized on a substrate, such as a bead, using covalent or non-covalent binding partners, e.g., an affinity element and an affinity binding partner. In some such embodiments, affinity element is biotin and the solid support comprises streptavidin. For example, a transposome complex is immobilized on a streptavidin-coated bead through a biotinylated linker attached to the transposome complex. In some embodiments, the transposome complex is immobilized to the bead through a biotin or other affinity element covalently bound to the polynucleotide transposase adaptor (or one or both polynucleotide transposase adaptors, when the transposase is a dimer).

In some embodiments, both the transposase enzyme and the polynucleotide are immobilized to the solid support. In some embodiments, the transposase enzymes only are immobilized to the solid support while adaptor polynucleotides are free to migrate. In some embodiments, transposome complexes are immobilized to a solid support in the reaction portion. In some embodiments, a transposase is immobilized on a solid support in the reaction portion. In some further embodiment, the solid support comprises or is a bead. In one embodiment, the bead is a paramagnetic bead.

An affinity element, as used herein, is a moiety that can be used to bind, covalently or non-covalently, to an affinity binding partner. In some aspects, the affinity element is on the transposome complex and the affinity binding partner is on the solid support. Exemplary affinity element/binding partner combinations that can be readily adapted for use with the present disclosure are described, for example, in WO 2018/156519, or U.S. Pat. Publ. No. 2018/0245069, each of which is incorporated herein by reference in its entirety. In other embodiments, the affinity element/binding partner combination comprises or is FITC/anti-FITC, digoxigenin/digoxigenin antibody, or hapten/antibody. Further suitable affinity pairs include, but not limited to, dithiobiotin-avidin, iminobiotin-avidin, biotin-avidin, dithiobiotin-succinilated avidin, iminobiotin-succinilated avidin, biotin-streptavidin, and biotin-succinilated avidin.

As used herein, a cleavable linker is a molecule with two functional heads joined together through a cleavable bond. The two functional heads serve to attach the linker to other moieties; in this case, the cleavable linker connects the 5' end of the first transposon sequence to an affinity element. A cleavable linker as used herein is a linker that may be cleaved through chemical or physical means, such as, for example, photolysis, chemical cleavage, thermal cleavage, or enzymatic cleavage. In some embodiments the cleavage may be by biochemical, chemical, enzymatic, nucleophilic, reduction sensitive agent or other means. An overview of cleavable linkers classified according to their cleavage conditions and biological applications are listed by Wagner et al., Bioorg. Med. Chem. 20, 571-582 (2012), which is incorporated herein by reference; see also e.g., U.S. Pat. Publ. Nos. 2012/0208705 and 2012/0208724, and PCT Publ. No. WO 2012/061832, each of which is incorporated by reference in its entirety.

The terms "solid surface," "solid support," and other grammatical equivalents refer to any material that is appropriate for or can be modified to be appropriate for the attachment of the transposome complexes. As will be appreciated by those in the art, the number of possible substrates is multitude. Possible substrates include, but are not limited to, glass and modified or functionalized glass, plastics (including acrylics, polystyrene and copolymers of styrene and other materials, polypropylene, polyethylene, polybutylene, polyurethanes, TEFLON, etc.), polysaccharides, nylon or nitrocellulose, ceramics, resins, silica or silica-based materials including silicon and modified silicon, carbon, metals, inorganic glasses, plastics, optical fiber bundles, beads, paramagnetic beads, and a variety of other polymers.

In the methods and devices presented herein, transposome complexes are immobilized to a solid support. In one embodiment, the solid support is a bead. Suitable bead compositions include, but are not limited to, plastics, ceramics, glass, polystyrene, methylstyrene, acrylic polymers, paramagnetic materials, thoria sol, carbon graphite, titanium dioxide, latex or cross-linked dextrans such as Sepharose, cellulose, nylon, cross-linked micelles and TEFLON, as well as any other materials outlined herein for solid supports. In certain embodiments, the microspheres are magnetic microspheres or beads, for example paramagnetic particles, spheres or beads. The beads need not be spherical; irregular particles may be used. Alternatively or additionally, the beads may be porous. The bead sizes range from nanometers, e.g., 100 nm, to millimeters, e.g., 1 mm, with beads from about 0.2 micron to about 200 microns being preferred, and from about 0.5 to about 5 micron being particularly preferred, although in some embodiments smaller or larger beads may be used. The bead may be coated with an affinity binding partner, for example the bead may be streptavidin coated. In some embodiments the beads are streptavidin coated paramagnetic beads, for example, Dynabeads MyOne streptavidin C1 beads (Thermo Scientific catalog #65601), Streptavidin MagneSphere Paramagnetic particles (Promega catalog #Z5481), Streptavidin Magnetic beads (NEB catalog #S1420S) and MaxBead Streptavidin (Abnova catalog #U0087). The solid support could also be a slide, for example a flowcell or other slide that has been modified such that the transposome complex can be immobilized thereon.

In some embodiments of the present disclosure, solid supports comprised of an inert substrate or matrix (e.g., glass slides, polymer beads, etc.) which has been functionalized, for example by application of a layer or coating of an intermediate material comprising reactive groups which permit covalent attachment to molecules, such as polynucleotides. Examples of such supports include, but are not limited to, polyacrylamide hydrogels supported on an inert substrate such as glass, particularly polyacrylamide hydrogels as described in WO2005/065814 and US2008/0280773, the contents of which are incorporated herein in their entirety by reference. The methods of tagmenting (fragmenting and tagging) DNA on a solid surface for the construction of a tagmented DNA library are described in WO2016/189331 and US2014/0093916A1, which are incorporated herein by reference in their entireties.

Amplification

It will be appreciated that any of the amplification methodologies described herein or generally known in the art can be utilized with universal or target-specific primers to amplify DNA fragments. Suitable methods for amplification include, but are not limited to, the polymerase chain reaction (PCR), strand displacement amplification (SDA), transcription mediated amplification (TMA) and nucleic acid sequence based amplification (NASBA), as described in U.S. Pat. No. 8,003,354, which is incorporated herein by reference in its entirety. The above amplification methods can be employed to amplify one or more nucleic acids of interest. For example, PCR, including multiplex PCR, SDA, TMA, NASBA and the like can be utilized to amplify nucleic acid fragments. In some embodiments, primers directed specifically to the nucleic acid of interest are included in the amplification reaction.

Other suitable methods for amplification of nucleic acids can include oligonucleotide extension and ligation, rolling circle amplification (RCA) (Lizardi et al., Nat. Genet. 19:225-232 (1998), which is incorporated herein by reference) and oligonucleotide ligation assay (OLA) (See generally U.S. Pat. Nos. 7,582,420, 5,185,243, 5,679,524 and 5,573,907; EP 0 320 308 B1; EP 0 336 731 B1; EP 0 439 182 B1; WO 90/01069; WO 89/12696; and WO 89/09835, all of which are incorporated by reference) technologies. It will be appreciated that these amplification methodologies can be designed to amplify nucleic acid fragments. For example, in some embodiments, the amplification method can include ligation probe amplification or oligonucleotide ligation assay (OLA) reactions that contain primers directed specifically to the nucleic acid of interest. In some embodiments, the amplification method can include a primer extension-ligation reaction that contains primers directed specifically to the nucleic acid of interest. As a non-limiting example of primer extension and ligation primers that can be specifically designed to amplify a nucleic acid of interest, the amplification can include primers used for the GoldenGate assay (Illumina, Inc., San Diego, Calif.) as exemplified by U.S. Pat. Nos. 7,582,420 and 7,611,869, each of which is incorporated herein by reference in its entirety.

Exemplary isothermal amplification methods that can be used in a method of the present disclosure include, but are not limited to, Multiple Displacement Amplification (MDA) as exemplified by, for example Dean et al., Proc. Natl. Acad. Sci. USA 99:5261-66 (2002) or isothermal strand displacement nucleic acid amplification exemplified by, for example U.S. Pat. No. 6,214,587, each of which is incorporated herein by reference in its entirety. Other non-PCR-based methods that can be used in the present disclosure include, for example, strand displacement amplification (SDA) which is described in, for example Walker et al., Molecular Methods for Virus Detection, Academic Press, Inc., 1995; U.S. Pat. Nos. 5,455,166, and 5,130,238, and Walker et al., Nucl. Acids Res. 20:1691-96 (1992) or hyperbranched strand displacement amplification which is described in, for example Lage et al., Genome Research 13:294-307 (2003), each of which is incorporated herein by reference in its entirety. Isothermal amplification methods can be used with the strand-displacing Phi 29 polymerase or Bst DNA polymerase large fragment, 5'->3' exo⁻ for random primer amplification of genomic DNA. The use of these polymerases takes advantage of their high processivity and strand displacing activity. High processivity allows the polymerases to produce fragments that are 10-20 kb in length. As set forth above, smaller fragments can be produced under isothermal conditions using polymerases having low processivity and strand-displacing activity such as Klenow polymerase. Additional description of amplification reactions, conditions and components are set forth in detail in the disclosure of U.S. Pat. No. 7,670,810, which is incorporated herein by reference in its entirety.

Another nucleic acid amplification method that is useful in the present disclosure is Tagged PCR which uses a population of two-domain primers having a constant 5' region followed by a random 3' region as described, for example, in Grothues et al. Nucleic Acids Res. 21(5):1321-2 (1993), incorporated herein by reference in its entirety. The first rounds of amplification are carried out to allow a multitude of initiations on heat denatured DNA based on individual hybridization from the randomly-synthesized 3' region. Due to the nature of the 3' region, the sites of initiation are contemplated to be random throughout the genome. Thereafter, the unbound primers can be removed and further replication can take place using primers complementary to the constant 5' region.

Preparing Sequencing Fragments—Amplification of Tagged Fragments

In some aspects are provided methods for preparing sequencing fragments from a target nucleic acid, the method comprising providing a solid support comprising a transposome complex described herein immobilized thereon as described herein; contacting the solid support with a target nucleic acid under conditions to fragment the target nucleic acid and ligate a first transposon to the 5' end of the fragments, whereby the fragment becomes immobilized on the solid support. In some aspects, the method further comprises amplifying the fragmented nucleic acids. In some embodiment, the fragment condition is a condition suitable for tagmentation by using the transposome complex to fragment and tag the target nucleic acid.

In some embodiments of the methods described herein, following the fragmenting and tagging, the methods further comprise removing the transposase from the 5' tagged target fragments to provide non-complexed 5' tagged target fragments. Removal of the transposase may be accomplished under chemical conditions, such as, treatment with a denaturing agent such as sodium dodecyl sulfate (SDS). Such methods may further comprise generating fully duplexed versions of the 5' tagged target fragments. Generating the full duplex may comprise removing the annealed (but not ligated) second transposon from the 5' tagged target fragments and extending the 5' tagged target fragments to generate fully duplexed 5' tagged target fragments. The generating may be accomplished, for example, by heating the non-complexed 5' tagged target fragments to a temperature sufficient to selectively denature the second transposon, leaving the remaining duplex region of the fragment intact. Extending may be accomplished in the presence of dNTP and a suitable polymerase. Alternatively, the generating may be accomplished in one reaction, by incubating the non-complexed 5' tagged target fragments in the presence of single nucleotides (dNTPs) and a polymerase. In some embodiments, the incubating includes heating at one or more temperatures sufficient to denature the annealed second transposon and extend the remaining duplexes. In other embodiments, the polymerase is a strand-displacing polymerase, which serves to remove the second transposon and extend the remaining duplex to generate fully duplexed 5' tagged target fragments. Suitable polymerases include KAPA HiFi, Pfu, and similar enzymes. Suitable polymerases include strand-displacing polymerases such as Bst, Bsu Vent, Klenow, and similar enzymes.

In some aspects, the methods further comprise amplifying the fully duplexed 5' tagged target fragments. The amplifying may be done by any suitable amplification method, such as polymerase chain reaction (PCR), rolling circle amplification (RCA), or multiple displacement amplification (MDA). In some embodiments, amplifying is done by PCR. In some embodiments, the amplification and extending are done in one reaction step, by reacting with dNTPs in the presence of a polymerase.

In some embodiments, the amplifying serves to add one or more secondary adaptor sequences to the fully duplexed 5' tagged target fragments to form sequencing fragments. The amplifying is accomplished by incubating a fully duplexed 5' tagged target fragment comprising a primer sequence at each end with a secondary adaptor carrier, single nucleotides, and a polymerase under conditions sufficient to amplify the target fragments and incorporate the secondary adaptor carrier (or complement thereof), wherein the secondary adaptor carrier comprises the complement to the primer sequence and a secondary adaptor sequence.

In some embodiments, the secondary adaptor carrier comprises a primer sequence, an index sequence, a barcode sequence, a purification tag, or a combination thereof. In some embodiments, the secondary adaptor carrier comprises a primer sequence. In some embodiments, the secondary adaptor carrier comprises an index sequence. In some embodiments, the secondary adaptor carrier comprises an index sequence and a primer sequence.

In some embodiments, the fully duplexed 5' tagged target fragments comprise a different primer sequence at each end. In such embodiments, each secondary adaptor carrier comprises the complement to one of the two primer sequences. In some embodiments, a two primer sequences are an A14 primer sequence and a B15 primer sequence.

In some embodiments, a plurality of secondary adaptors are added by amplification. In some embodiments, the secondary adaptor carriers each comprise one of two primer sequences. In some embodiments, the secondary adaptor carriers each comprise one of a plurality of index sequences. In some embodiments, the secondary adaptor carriers comprise secondary adaptors with a P5 primer sequence and secondary adaptors with a P7 primer sequence.

In some aspects, the tagged fragments comprise homo- and hetero-tagged fragments, e.g., some fragments that have the same tag at either end (homo-tagged fragments), and some fragments that have the first tag at one end and the second tag at the other end (hetero-tagged fragments). In some aspects, amplification of the mixture with "suppression PCR" is used to enrich for the hetero-tagged fragments. In other aspects, amplification is done using a "forked" adaptor to install another tag that is different from the first tag. Once a population of hetero-tagged fragments is produced, further amplification and sequencing may be performed.

In some embodiments, the sequencing fragments are deposited on a flow cell. In some embodiments, the sequencing fragments are hybridized to complementary primers grafted to the flow cell or surface. In some embodiments, the sequences of the sequencing fragments are detected by array sequencing or next-generation sequencing methods, such as sequencing-by-synthesis.

The P5 and P7 primers are used on the surface of commercial flow cells sold by Illumina, Inc., for sequencing on various Illumina platforms. The primer sequences are described in U.S. Patent Publication No. 2011/0059865 A1, which is incorporated herein by reference in its entirety. Examples of P5 and P7 primers, which may be alkyne terminated at the 5' end, include the following:

P5:
(SEQ ID NO. 1)
AATGATACGGCGACCACCGAGATCTACAC

P7:
(SEQ ID NO. 2)
CAAGCAGAAGACGGCATACGAG*AT and derivatives thereof. In some examples, the P7 sequence includes a modified guanine at the G* position, e.g., an 8-oxo-guanine. In other examples, the * indicates that the bond between the G* and the adjacent 3' A is a phosphorothioate bond. In some examples, the P5 and/or P7 primers include unnatural linkers. Optionally, one or both of the P5 and P7 primers can include a poly T tail. The poly T tail is generally located at the 5' end of the sequence shown above, e.g., between the 5' base and a terminal alkyne unit, but in some cases can be located at the 3' end. The poly T sequence can include any number of T nucleotides, for example, from 2 to 20. While the P5 and P7 primers are given as examples, it is to be understood that any suitable amplification primers can be used in the examples presented herein.

In some embodiments, the amplifying step of the method comprises PCR or isothermal amplification. In some embodiments, the amplifying step of the method comprises PCR.

Methods of Sequencing

Some of the methods provided herein include methods of analyzing nucleic acids. Such methods include preparing a library of template nucleic acids of a target nucleic acid, obtaining sequence data from the library of template nucleic acids, and assembling a sequence representation of the target nucleic acid. In some embodiments, the methods described herein can be used in next-generation sequencing workflows including, but not limited to, sequencing by synthesis (SBS). Exemplary SBS procedures, fluidic systems, and detection platforms that can be readily adapted for use with nucleic acid libraries produced by the methods of the present disclosure are described, for example, in Bentley et al., Nature 456:53-59 (2008), WO 04/018497; U.S. Pat. No. 7,057,026; WO 91/06678; WO 07/123744; U.S. Pat. Nos. 7,329,492; 7,211,414; 7,315,019; 7,405,281, and US 2008/0108082, each of which is incorporated herein by reference.

Some SBS embodiments include detection of a proton released upon incorporation of a nucleotide into an extension product. For example, sequencing based on detection of released protons can use an electrical detector and associated techniques that are commercially available from Ion Torrent (Guilford, Conn., a Life Technologies subsidiary) or sequencing methods and systems described in US 2009/0026082 A1; US 2009/0127589 A1; US 2010/0137143 A1; or US 2010/0282617 A1, each of which is incorporated herein by reference.

Another useful sequencing technique is nanopore sequencing (see, for example, Deamer et al. Trends Biotechnol. 18, 147-151 (2000); Deamer et al. Acc. Chem. Res. 35:817-825 (2002); Li et al. Nat. Mater. 2:611-615 (2003), the disclosures of which are incorporated herein by reference). The methods described herein are not limited to any particular type of sequencing instrumentation used.

The following numbered items provide additional support for and descriptions of the embodiments herein.

Item 1. A method for performing an enzymatic reaction using electrophoresis, comprising:
(a) providing an electrophoresis system comprising:
an electrophoresis gel matrix having a first end and a second end and a length between the first and second ends;
a first portion proximate to the first end and containing a first enzyme cofactor for an enzyme;
a second portion proximate to the second end and containing a second enzyme cofactor for the enzyme, the second enzyme cofactor having an electrical charge opposite to that of the first enzyme cofactor;
a reaction portion between the first portion and the second portion and containing the enzyme; and
a pair of positive and negative electrodes arranged at the first and second ends, respectively; and
(b) applying an electric field between the pair of electrodes to drive the first enzyme cofactor from the first portion into the reaction portion and drive the second enzyme cofactor from the second portion into the reaction portion to form an activated enzyme complex comprising the enzyme, the first enzyme cofactor, and the second enzyme cofactor.

Item 2. The method of item 1, wherein upon the first enzyme cofactor is a metallic ion and the second enzyme cofactor is a polynucleotide.

Item 3. The method of item 1, further comprising applying a substrate for the activated enzyme complex to the reaction portion prior to step (c), and wherein applying the electric field comprises reacting the activated enzyme complex with the substrate in the reaction portion to form a reaction product.

Item 4. The method of any one of items 1 to 3, wherein applying the electric field comprises migrating unreacted first and second enzyme cofactors out of the reaction portion to separate the unreacted first and second enzyme cofactors from the reaction product in the reaction portion.

Item 5. The method of any one of items 1 to 4, wherein the first electrode is a positive electrode and the first enzyme cofactor is positively charged, and the second electrode is a negative electrode and the second enzyme cofactor is negatively charged.

Item 6. The method of any one of items 3 to 5, wherein the substrate is a target double-stranded nucleic acid.

Item 7. The method of item 6, wherein the target double-stranded nucleic acid is double-stranded DNA, double-stranded RNA, or a DNA/RNA hybrid.

Item 8. The method of any one of items 1 to 7, wherein the enzyme is a transposase, optionally wherein the transposase is a Tn5 transposase.

Item 9. The method of item 8, wherein the first enzyme cofactor comprises Mg2+, optionally in the form of Mg(OAc)2 or MgCl2.

Item 10. The method of item 8 or item 9, wherein the second enzyme cofactor is a polynucleotide transposase adaptor comprising a double-stranded transposon end sequence and a single-stranded tag region.

Item 11. The method of item 10, wherein the second enzyme cofactor is a mixture of two polynucleotide transposase adaptors, wherein each adaptor comprises the same double-stranded transposon end sequence and a different single-stranded tag region.

Item 12. A method of preparing a library of tagged nucleic acid fragments from a target double-stranded nucleic acid, the method comprising:
(a) providing an electrophoresis system comprising:
an electrophoresis gel matrix having a first end and a second end, a width, and a length between the first and second ends;
a first portion proximate to the first end and containing a first transposase cofactor, wherein the first transposase cofactor is a metallic ion;
a reaction portion distant to the first end and containing a transposome complex comprising a transposase and a polynucleotide transposase adaptor comprising a double-stranded transposon end sequence and a single-stranded tag region; and a pair of positive and negative electrodes arranged at the first and second ends, respectively;
(b) applying a target double-stranded nucleic acid to the reaction portion;
(c) applying a first electric field between the pair of electrodes to drive the first transposase cofactor from the first portion into the reaction portion to form an activated transposome complex comprising the transposase, the polynucleotide transposase adaptor, and the first transposase cofactor; and
(d) incubating the target double-stranded nucleic acid with the activated transposome complex in the reaction portion under conditions sufficient to fragment the target double-stranded nucleic acid, not a plurality of nucleic acid fragments, and tag the nucleic acid fragments, thereby generating a library of tagged nucleic acid fragments.

Item 13. The method of item 12, wherein the transposome complex is immobilized on a solid support in the reaction portion, optionally via streptavidin-biotin interaction.

Item 14. The method of item 13, comprising releasing the transposome complex from the solid support after generating the tagged nucleic acid fragments.

Item 15. The method of item 14, further comprising varying the magnitude of the first electric field after step to drive the tagged nucleic acid fragments bound to the transposome complex released from the solid support into the collection portion.

Item 16. A method of preparing a library of tagged nucleic acid fragments from a target double-stranded nucleic acid, the method comprising:
(a) providing an electrophoresis system comprising:
an electrophoresis gel matrix having a first end and a second end, a width, and a length between the first and second ends;
a first portion proximate to the first end and containing a first transposase cofactor for a transposase, wherein the first transposase cofactor is a metallic ion;
a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
a reaction portion between the first portion and the second portion and containing the transposase; and
a pair of positive and negative electrodes arranged at the first and second ends, respectively;
(b) applying a target double-stranded nucleic acid to the reaction portion;
(c) applying a first electric field between the pair of electrodes to drive the first transposase cofactor from the first portion into the reaction portion and drive the second transposase cofactor from the second portion into the reaction portion to form an activated transposome complex comprising the transposase, the first transposase cofactor, and the second transposase cofactor; and
(d) incubating the target double-stranded nucleic acid with the activated transposome complex in the reaction portion under conditions sufficient to fragment the target double-stranded nucleic acid, not a plurality of nucleic acid fragments, and tag the nucleic acid fragments, thereby generating a library of tagged nucleic acid fragments.

Item 17. The method of any one of items 12-16, wherein the metallic ion is Mg2+, optionally in the form of Mg(OAc)2 or MgCl2.

Item 18. The method of any one of items 12-17, wherein the single-stranded tag region comprises one or more of a primer sequence, a barcode sequence, a unique molecular identifier (UMI) sequence, an amplification tag, an enrichment tag, or a purification tag.

Item 19. The method of any one of items 12-18, wherein the transposase is a Tn5 transposase.

Item 20. The method of any one of items 16-19, wherein the transposase is immobilized on a solid support within the reaction portion, optionally wherein the reaction portion comprises a well and the solid support is a bead particle or the surface of the well.

Item 21. The method of any one of items 12-20, wherein the target double-stranded nucleic acid is double-stranded DNA, double-stranded RNA, or a DNA/RNA hybrid.

Item 22. The method of any one of items 12-21, wherein the first electric field applied in step (c) is set at a value at which the target double-stranded nucleic acid has substantially no electrophoretic mobility within the electrophoresis matrix.

Item 23. The method of any one of items 12-22, wherein the electrophoresis system comprises a collection portion between the first portion and the reaction portion along the length.

Item 24. The method of item 23, wherein applying the first electric field in step (c) comprises driving the tagged nucleic acid fragments into the collection portion.

Item 25. The method of item 23, comprising increasing the magnitude of the first electric field after step (d) to drive the tagged nucleic acid fragments into the collection portion.

Item 26. The method of any one of items 12-25, comprising varying a magnitude or a direction of the first electric field across the electrophoresis gel matrix.

Item 27. The method of any one of items 12-26, wherein the electrophoresis system comprises additional portions along the width and the length, each containing different reagents for tagmentation, and a second pair of positive and negative electrodes at opposite sides of the width at one of the first end or the second end.

Item 28. The method of item 27, comprising applying a second electric field between the second pair of electrodes, wherein the direction of second electric field is perpendicular to the direction of first electric field applied in step (c).

Item 29. The method of any one of items 12-28, wherein applying a target double-stranded nucleic acid comprises adding a biological sample to the reaction portion.

Item 30. The method of item 29, wherein the biological sample comprises a cell lysate.

Item 31. The method of item 29, wherein the biological sample comprises whole cells.

Item 32. The method of any one of items 12-31, wherein the electrophoresis system comprises a third portion containing a lysis reagent and the reaction portion contains whole cells, and the method further comprises applying a third electric field to drive the lysis agent into and/or through the reaction portion to lyse the cells, thereby applying the target double-stranded nucleic acid to the sample portion.

Item 33. A method of preparing a library of tagged nucleic acid fragments from a target double-stranded nucleic acid, the method comprising:
(a) providing an electrophoresis system comprising:
an electrophoresis gel matrix having a first end and a second end, a width, and a length between the first and second ends;
a first portion containing a first transposase cofactor for a transposase, wherein the first transposase cofactor is a metallic ion;
a second portion containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
a third portion containing a lysis reagent;
a fourth portion containing the transposase;
a reaction portion between the first portion and the second portion; and
a first pair of positive and negative electrodes arranged at the first and second ends, respectively; and
a second pair of positive and negative electrodes arranged at opposite sides of the width at one of the first end or the second end;
(b) applying whole cells containing a target double-stranded nucleic acid to the reaction portion;
(c) applying a first electric field to drive the lysis agent into and/or through the reaction portion to lyse the cells, thereby applying the target double-stranded nucleic acid to the sample portion;
(d) applying a second electric field to drive the first transposase cofactor from the first portion into the reaction portion, drive the second transposase cofactor from the second portion into the reaction portion, and/or drive the transposase from the transposase portion to the reaction portion to form an activated transposome complex comprising the transposase, the first transposase cofactor, and the second transposase cofactor; and
(e) incubating the target double-stranded nucleic acid with the activated transposome complex in the reaction portion under conditions sufficient to fragment the target double-stranded nucleic acid not a plurality of nucleic acid fragments and tag the nucleic acid fragments, thereby generating a library of tagged nucleic acid fragments.

Item 34. The method of item 33, wherein the first electric field and the second electric field are different, and step (c) is performed prior to step (d).

Item 35. The method of item 33, wherein the first electric field and the second electric field are same, and step (c) is performed simultaneously with step (d).

Item 36. The method of any one of items 33-35, comprising applying one or more electric fields following the generating of the library of tagged nucleic acid fragments to drive one or more of the lysis reagent, transposome complex, transposase, transposase adaptor, metallic ion, and tagged nucleic acid fragments out of the reaction portion.

Item 37. The method of item 36, comprising driving the tagged nucleic acid fragments into a collection portion.

Item 38. The method of item 36, comprising driving the lysis reagent, transposome complex, metallic ion, and tagged nucleic acid fragments out of the reaction portion and into separate receiver portions.

Item 39. An electrophoresis device comprising:
an electrophoresis gel matrix having a first end, a second end and a length between the first and second ends;
a first portion proximate to the first end and containing a first enzyme cofactor for an enzyme;
a second portion proximate to the second end and containing a second enzyme cofactor for the enzyme, the second enzyme cofactor having an electrical charge opposite to that of the first enzyme cofactor;
a reaction portion between the first portion and the second portion and containing the enzyme; and
a pair of positive and negative electrodes arranged at the first and second ends, respectively.

Item 40. The device of item 39, wherein a substrate for the enzyme is provided in the reaction portion.

Item 41. An electrophoresis device comprising:
an electrophoresis gel matrix having a first end and a second end, a width, and a length between the first and second ends;
a first portion proximate to the first end and containing a first transposase cofactor, wherein the first transposase cofactor is a metallic ion;
a reaction portion distant to the first end and containing a transposome complex comprising a transposase and a polynucleotide transposase adaptor comprising a double-stranded transposon end sequence and a single-stranded tag region; and
a pair of positive and negative electrodes arranged at the first and second ends, respectively.

Item 42. An electrophoresis device comprising:
an electrophoresis gel matrix having a first end, a second end, and a length between the first and second ends;
a first portion proximate to the first end and containing a first transposase cofactor for a transposase, wherein the first transposase cofactor is a metallic ion;
a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
a reaction portion between the first end and the second end and containing the transposase; and
a pair of positive and negative electrodes arranged at the first and second ends, respectively.

Item 43. The device of item 41 or item 42, wherein a target nucleic acid is provided in the reaction portion.

Item 44. An electrophoresis device comprising:
an electrophoresis gel matrix having a first end and a second end, a width, and a length between the first and second ends;
a first portion proximate to the first end and containing a first transposase cofactor for a transposase, wherein the first transposase cofactor is a metallic ion;
a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
a third portion containing a lysis reagent;
a fourth portion containing the transposase;
a reaction portion between the first end and the second end; and
a first pair of positive and negative electrodes arranged at the first and second ends, respectively; and
a second pair of positive and negative electrodes arranged at opposite sides of the width at one of the first end or the second end.

Item 45. The device of item 44, wherein whole cells containing a target nucleic acid are provided in the reaction portion.

Item 46. The device of any one of items 41-45, comprising additional portions along the width and/or the length, each containing different reagents for tagmentation.

Item 47. The device of any one of items 41-46, comprising a collection portion to receive the tagged nucleic acid fragments.

Item 48. The device of any one of items 41-47, comprising one or more receiver portions to receive the unreacted reagents.

Item 49. The device of any one of items 41-48, wherein the pair of positive and negative electrodes are in direct contact with the electrophoresis gel matrix, optionally being embedded in the gel matrix.

Item 50. A system for preparing a library of tagged nucleic acid fragments from a target double-stranded nucleic acid, comprising:
the device of any one of items 41-49;
a power supply;
a controller configured to control direction and/or magnitude of the first and second electric fields to drive the reagents and/or tagged nucleic acid fragments into and/or through the reaction portion, collection portion, and/or receiver portions.

Throughout this application various publications, patents and/or patent applications have been referenced. The disclosure of these publications in their entireties is hereby incorporated by reference in this application.

The foregoing written specification is considered to be sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

As used herein, the term about refers to a numeric value, including, for example, whole numbers, fractions, and percentages, whether or not explicitly indicated. Each number in the specification or claims may be considered modified by the term about. The term about generally refers to a range of numerical values (e.g., +/−5-10% of the recited range) that one of ordinary skill in the art would consider equivalent to the recited value (e.g., having the same function or result). When terms such as at least and about precede a list of numerical values or ranges, the terms modify all of the values or ranges provided in the list. In some instances, the term about may include numerical values that are rounded to the nearest significant figure.

What is claimed is:

1. A method of preparing a library of tagged nucleic acid fragments from a target double-stranded nucleic acid, the method comprising:

(a) first providing an electrophoresis system comprising:

a single electrophoresis gel matrix having a first end and a second end, a width, and a length between the first and second ends, wherein all reactants other than a sample to be reacted are present in the electrophoresis gel matrix prior to electrophoresis operation and reactants other than the sample are not added or removed from the electrophoresis gel matrix during a sample run prior to elution;

a first portion proximate to the first end and containing a first transposase cofactor, wherein the first transposase cofactor is a metallic ion;

a reaction portion distant to the first end and containing a transposome complex comprising a transposase and a polynucleotide transposase adaptor comprising a double-stranded transposon end sequence and a single-stranded tag region; and a pair of positive and negative electrodes arranged at the first and second ends, respectively;

(b) after step (a), applying the sample to the reaction portion, wherein the sample comprises a target double-stranded nucleic acid;

(c) after step (b), applying a first electric field between the pair of electrodes to drive the first transposase cofactor from the first portion into the reaction portion to form an activated transposome complex comprising the transposase, the polynucleotide transposase adaptor, and the first transposase cofactor; and (d) after step (c), incubating the target double-stranded nucleic acid with the activated transposome complex in the reaction portion under conditions sufficient to fragment the target double-stranded nucleic acid and tag the nucleic acid fragments, thereby generating a library of tagged nucleic acid fragments.

2. The method of claim 1, wherein the transposome complex is immobilized on a solid support in the reaction portion, optionally via streptavidin-biotin interaction.

3. The method of claim 2, comprising releasing the transposome complex from the solid support after generating the tagged nucleic acid fragments.

4. The method of claim 3, further comprising varying the magnitude of the first electric field after step (d) to drive the tagged nucleic acid fragments bound to the transposome complex released from the solid support into a collection portion.

5. A method of preparing a library of tagged nucleic acid fragments from a target double-stranded nucleic acid, the method comprising:
   (a) first providing an electrophoresis system comprising:
   a single electrophoresis gel matrix having a first end and a second end, a width, and a length between the first and second ends, wherein all reactants other than a sample to be reacted are present in the electrophoresis gel matrix prior to electrophoresis operation and reactants other than the sample are not added or removed from the electrophoresis gel matrix during a sample run prior to elution;
   a first portion proximate to the first end and containing a first transposase cofactor for a transposase, wherein the first transposase cofactor is a metallic ion;
   a second portion proximate to the second end and containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
   a reaction portion between the first portion and the second portion and containing the transposase; and
   a pair of positive and negative electrodes arranged at the first and second ends, respectively;
   (b) after step (a), applying the sample to the reaction portion, wherein the sample comprises a target double-stranded nucleic acid;
   (c) after step (b), applying a first electric field between the pair of electrodes to drive the first transposase cofactor from the first portion into the reaction portion and drive the second transposase cofactor from the second portion into the reaction portion to form an activated transposome complex comprising the transposase, the first transposase cofactor, and the second transposase cofactor; and
   (d) after step (c), incubating the target double-stranded nucleic acid with the activated transposome complex in the reaction portion under conditions sufficient to fragment the target double-stranded nucleic acid and tag the nucleic acid fragments, thereby generating a library of tagged nucleic acid fragments.

6. The method of claim 5, wherein the single-stranded tag region comprises one or more of a primer sequence, a barcode sequence, a unique molecular identifier (UMI) sequence, an amplification tag, an enrichment tag, or a purification tag.

7. The method of claim 5, wherein the transposase is immobilized on a solid support within the reaction portion, optionally wherein the reaction portion comprises a well and the solid support is a bead particle or the surface of the well.

8. The method of claim 5, wherein the first electric field applied in step (c) is set at a value at which the target double-stranded nucleic acid has no electrophoretic mobility within the electrophoresis matrix.

9. The method of claim 5, wherein the electrophoresis system comprises a collection portion between the first portion and the reaction portion along the length.

10. The method of claim 9, further comprising:
   (e) after step (d), applying the first electric field to drive the tagged nucleic acid fragments into the collection portion.

11. The method of claim 5, comprising varying a magnitude or a direction of the first electric field across the electrophoresis gel matrix.

12. The method of claim 5, wherein the electrophoresis system comprises additional portions along the width and the length, each containing different reagents for tagmentation, and a second pair of positive and negative electrodes at opposite sides of the width at one of the first end or the second end.

13. The method of claim 12, comprising applying a second electric field between the second pair of electrodes, wherein the direction of second electric field is perpendicular to the direction of first electric field applied in step (c).

14. A method of preparing a library of tagged nucleic acid fragments from a target double-stranded nucleic acid, the method comprising:
   (a) first providing an electrophoresis system comprising:
   a single electrophoresis gel matrix having a first end and a second end, a width, and a length between the first and second ends, wherein all reactants other than a sample to be reacted are present in the electrophoresis gel matrix prior to electrophoresis operation and reactants other than the sample are not added or removed from the electrophoresis gel matrix during a sample run prior to elution such that multiple reactions take place within the electrophoresis gel matrix;
   a first portion containing a first transposase cofactor for a transposase, wherein the first transposase cofactor is a metallic ion;
   a second portion containing a second transposase cofactor for the transposase, the second transposase cofactor having an electrical charge opposite to that of the first transposase cofactor, wherein the second transposase cofactor is a polynucleotide transposase adaptor comprising a double-stranded transposon end sequence and a single-stranded tag region;
   a third portion containing a lysis reagent;
   a fourth portion containing the transposase;
   a reaction portion between the first portion and the second portion; and
   a first pair of positive and negative electrodes arranged at the first and second ends, respectively; and
   a second pair of positive and negative electrodes arranged at opposite sides of the width at one of the first end or the second end;
   (b) after step (a), applying the sample to the reaction portion, wherein the sample comprises whole cells containing a target double-stranded nucleic acid;
   (c) after step (b), applying a first electric field to drive the lysis agent into and/or through the reaction portion to lyse the cells, thereby applying the target double-stranded nucleic acid to the reaction portion;
   (d) after step (b) applying a second electric field to drive the first transposase cofactor from the first portion into the reaction portion, drive the second transposase cofactor from the second portion into the reaction portion, and/or drive the transposase from the transposase portion to the reaction portion to form an activated transposome complex comprising the transposase, the first transposase cofactor, and the second transposase cofactor, wherein the first electric field is also applied during at least a portion of step (d); and
   (e) after step (d), incubating the target double-stranded nucleic acid with the activated transposome complex in the reaction portion under conditions sufficient to fragment the target double-stranded nucleic acid and tag the nucleic acid fragments, thereby generating a library of tagged nucleic acid fragments.

15. The method of claim 14, wherein the first electric field and the second electric field are different, and step (c) is performed prior to step (d); or wherein the first electric field and the second electric field form an aggregate, two-dimensional electric field, and step (c) is performed simultaneously with step (d).

16. An electrophoresis device comprising:
a single electrophoresis gel matrix having a first end and a second end, a width, and a length between the first and second ends, wherein all reactants other than a sample to be reacted are present in the electrophoresis gel matrix prior to electrophoresis operation and reactants other than the sample are not added or removed from the electrophoresis gel matrix during a sample run prior to elution;
a first portion proximate to the first end and containing a first transposase cofactor, wherein the first transposase cofactor is a metallic ion;
a reaction portion distant to the first end and containing a transposome complex comprising a transposase and a polynucleotide transposase adaptor comprising a double-stranded transposon end sequence and a single-stranded tag region; and
a pair of positive and negative electrodes arranged at the first and second ends, respectively.

\* \* \* \* \*